(12) United States Patent
Jobs et al.

(10) Patent No.: US 7,574,672 B2
(45) Date of Patent: Aug. 11, 2009

(54) TEXT ENTRY INTERFACE FOR A PORTABLE COMMUNICATION DEVICE

(75) Inventors: Steven P. Jobs, Palo Alto, CA (US); Scott Forstall, Mountain View, CA (US); Greg Christie, San Jose, CA (US); Bas Ording, San Francisco, CA (US); Imran Chaudhri, San Francisco, CA (US); Stephen O. Lemay, San Francisco, CA (US); Marcel Van Os, San Francisco, CA (US); Freddy Allen Anzures, San Francisco, CA (US); Mike Matas, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 343 days.

(21) Appl. No.: 11/459,610

(22) Filed: Jul. 24, 2006

(65) Prior Publication Data

US 2007/0152979 A1   Jul. 5, 2007

Related U.S. Application Data

(60) Provisional application No. 60/756,831, filed on Jan. 5, 2006.

(51) Int. Cl.
*G06F 3/048* (2006.01)
*G06F 3/14* (2006.01)
*G09G 5/00* (2006.01)

(52) U.S. Cl. .................. 715/830; 345/156; 345/173; 715/764; 715/810; 715/821; 715/822; 715/825; 715/828; 715/829; 715/831; 715/834; 715/835; 715/864

(58) Field of Classification Search ............... 345/156, 345/173; 715/764, 810, 821, 822, 825, 828, 715/829, 830, 831, 834, 835, 864
See application file for complete search history.

(56) References Cited

U.S. PATENT DOCUMENTS 5,748,512 A    5/1998   Vargas ..................... 364/709

(Continued)

FOREIGN PATENT DOCUMENTS

EP    0 588 210 A1    3/1994

(Continued)

OTHER PUBLICATIONS

Casario, M., "Hands on Macromedia World: Touch Screen Keypad for Mobile Phone by DoCoMo," http://casario.blogs.com/mmworld/2005/10/touch_screen_ke.html, printed Nov. 18, 2005, 1 page.

(Continued)

*Primary Examiner*—Stephen S Hong
*Assistant Examiner*—Grant D Johnson
(74) *Attorney, Agent, or Firm*—Morgan, Lewis & Bockius LLP

(57) ABSTRACT

A method includes displaying a first tray and a second tray in a display of the portable communications device. The first tray is configured to display one of more characters that were selected by a user using a click wheel. The second tray includes a first plurality of icons that correspond to a set of characters and one or more recommended words. The first tray includes a first region in a graphical user interface and the second tray includes a second region in the graphical user interface. Scrolling through the first plurality of icons and the one or more recommended words occurs in accordance with one or more navigation commands received from a click wheel.

20 Claims, 26 Drawing Sheets

U.S. PATENT DOCUMENTS

| | | | |
|---|---|---|---|
| 5,801,941 A | 9/1998 | Bertram | 364/188 |
| 5,963,671 A | 10/1999 | Comeford et al. | 382/230 |
| 6,011,542 A * | 1/2000 | Durrani et al. | 345/156 |
| 6,323,846 B1 | 11/2001 | Westerman et al. | 345/173 |
| 6,359,572 B1 | 3/2002 | Vale | 341/23 |
| 6,407,325 B2 | 6/2002 | Yi et al. | 84/610 |
| 6,570,557 B1 | 5/2003 | Westerman et al. | 345/173 |
| 6,573,844 B1 | 6/2003 | Venolia et al. | 341/22 |
| 6,597,345 B2 | 7/2003 | Hirshberg | 345/168 |
| 6,654,733 B1 | 11/2003 | Goodman et al. | 706/52 |
| 6,677,932 B1 | 1/2004 | Westerman | 345/173 |
| 7,107,147 B2 | 9/2006 | Pascual et al. | 701/200 |
| 7,149,550 B2 | 12/2006 | Kraft et al. | 455/566 |
| 7,286,115 B2 * | 10/2007 | Longe et al. | 345/168 |
| 2002/0015024 A1 | 2/2002 | Westerman et al. | 345/173 |
| 2002/0030665 A1 | 3/2002 | Ano | 345/168 |
| 2002/0072394 A1 | 6/2002 | Muramatsu | 455/566 |
| 2003/0076301 A1* | 4/2003 | Tsuk et al. | 345/159 |
| 2003/0104839 A1* | 6/2003 | Kraft et al. | 455/566 |
| 2003/0162569 A1 | 8/2003 | Arakawa et al. | 455/566 |
| 2004/0009788 A1 | 1/2004 | Mantyjarvi et al. | 455/550.1 |
| 2004/0055446 A1* | 3/2004 | Robbin et al. | 84/615 |
| 2004/0165924 A1 | 8/2004 | Griffin | 400/486 |
| 2004/0185912 A1 | 9/2004 | Mason et al. | 455/566 |
| 2004/0218963 A1 | 11/2004 | Van Diepen et al. | 400/472 |
| 2005/0195159 A1* | 9/2005 | Hunleth et al. | 345/156 |
| 2005/0253818 A1 | 11/2005 | Nettamo | 345/173 |
| 2005/0283724 A1 | 12/2005 | Griffin | 715/532 |
| 2007/0046641 A1* | 3/2007 | Lim | 345/173 |
| 2007/0106732 A1 | 5/2007 | Weis | 709/206 |

FOREIGN PATENT DOCUMENTS

| | | |
|---|---|---|
| EP | 1 510 911 A2 | 3/2005 |
| WO | WO 01/74133 A2 | 10/2001 |
| WO | WO 2005/006442 A1 | 7/2005 |

OTHER PUBLICATIONS

Day, B., "Will Cell Phones Render iPods Obsolete?" http://weblogs.javanet/pub/wig/883, printed Dec. 12, 2005, 3 pages.

Delta II™ Keypads, "Introducing the Ultimate Smartphone Keypad", http://www.chicagologic.com, printed Nov. 18, 2005, 2 pages.

DigitWireless, "Fastap™ Keypads Redefine Mobile Phones," http://www./digitwireless.com printed Nov. 18, 2005, 9 pages.

DigitWireless, "Fastap™," http://www.digitwireless.com/about/faq.html, Dec. 6, 2005, 5 pages.

MobileTouch "Synaptics: Handy Wie Einen iPod Bedienen," Sep. 21, 2004, http://www.golem.de/0409/33706.html, 2 pages.

Nokia, "7280 Interaktive Demos" screenshot Nov. 25, 2005, http://web.archive.org/web/20051125022636/europe.nokia.com/support/tutorials/7280/german/index.htm, 2 pages.

Nokia, "7280 Bedienungsanleitung" 2005, http://web.archive.org/web/20051222023851/http://ndsl.nokia.com/phones/files/guides/nokia7280_UDG-de.pdf, pp. 1-150.

O'Neal, W., "Smart Phones with Hidden Keyboards," http://msc.com/4250-6452_16-6229969-1.html, printed Nov. 18, 2005, 3 pages.

Phoneyworld, "You Heard of Touch Screens Now Check Out Touch Keys" http://www.phoneyworld.com, printed Nov. 18, 2005, 2 pages.

Sears, A., et al., "Data Entry for Mobile Devices Using Soft Keyboards: Understanding the Effects of Keyboard Size and User Tasks," Abstract, Int'l Journal of Human-Computer Interaction, 2003, vol. 16, No. 2, 1 page.

Solutions for Humans, "Compare Keyboards with the Keyboard Compatibility Chart, Learn more About Alternative Keyboards," http:www.keyalt.com/kkeybrdp.htm, printed Dec. 8, 2005, 5 pages.

"T9® Text Input for Keypad Devices," http://tegic.com.

Technology Loan Catalog, "Devices," http://www.tsbvi.edu/outreach/techloan/catalog.html, printed Dec. 8, 2005, 10 pages.

Textually, "LG Develops New Touch Pad Cell Phones," http://textually.org/textually/archives/2005/06/009903.htm, printed Nov. 18, 2005, 1 page.

Textually, "Microsoft New-Smart Phone Interface: Your Thumb," http://www.textually.org.org, printed Nov. 18, 2005, 2 pages.

Textually, "Samsung Releases Keyboard Phone in US," http://www.textually.org/textually/archives/2005/11/010482.htm, printed Nov. 18, 2005, 1 page.

WikiPodLinux, "Text Input Methods," http://ipodlinux.org/Tex_Input_Methods, printed Dec. 5, 2005, 18 pages.

International Search Report for International Application No. PCT/US2007/060120, mailed May 29, 2007. (Related application).

Office Action dated Nov. 3, 2008, for related U.S. Appl. No. 11/459,612.

Gibbs, K., "I've Got a Suggestion," posted on the Google Blog, Dec. 10, 2004, http://googleblog.blogspot.com.

Google, "Google Suggest FAQ," Google.com, retrieved on Apr. 1, 2009, from http://labs.google.com/suggestfaq.

Liu, J., "At a Loss for Words?", posted on the Google Blog, Aug. 25, 2008, http://googleblog.blogspot.com.

McAlister, J., "News + Suggest Join Forces," Apr. 28, 2006, posted on the Google Blog, http://googleblog.blogspot.com.

Torrone, P., "Google Suggest: The Movie," Dec. 11, 2004, posted on www.engadget.com.

Office Action dated Feb. 4, 2009, for related U.S. Appl. No. 11/459,609.

Office Action dated Apr. 7, 2009, for related U.S. Appl. No. 11/459,612.

* cited by examiner

TEXT ENTRY INTERFACE FOR A PORTABLE COMMUNICATION DEVICE

RELATED APPLICATIONS

This application claims priority to U.S. Provisional Patent Application No. 60/756,831, filed Jan. 5, 2006, entitled "Telephone Interface for a Portable Communication Device," which application is incorporated by reference in its entirety.

This application is related to U.S. patent application Ser. No. 11/459,609, filed Jul. 24, 2006, entitled "Telephone Interface for a Portable Communication Device," which application is incorporated by reference herein in its entirety.

This application is related to U.S. patent application Ser. No. 11/459,612, filed Jul. 24, 2006, entitled "Replay Recommendations in a Text Entry Interface," which application is incorporated by reference herein in its entirety.

TECHNICAL FIELD

The disclosed embodiments relate to user interfaces, and in particular, to telephone user interfaces that include a click wheel.

BACKGROUND

As portable devices become more compact, and the amount of information to be processed and stored increases, it has become a significant challenge to design a user interface that allows users to easily interact with the device. This is unfortunate since the user interface is the gateway through which users receive not only content but also responses to user actions or behaviors, including user attempts to access a device's features or tools. Some portable communication devices (e.g., mobile phones) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user. In addition, as the number of pushbuttons has increased, the proximity of neighboring buttons often makes it difficult for users to activate a desired pushbutton.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Accordingly, there is a need for more transparent and intuitive user interfaces for portable electronic devices that are easy to use, configure, and/or adapt.

SUMMARY OF EMBODIMENTS

The above deficiencies and other problems associated with user interfaces for portable devices are reduced or eliminated by the disclosed portable communication device that includes a text entry user interface.

In some embodiments, a method includes displaying a first tray and a second tray in a display of the portable communications device. The first tray is configured to display one of more characters that were selected by a user using a click wheel. The second tray includes a first plurality of icons that correspond to a set of characters and one or more recommended words. The first tray includes a first region in a graphical user interface and the second tray includes a second region in the graphical user interface. Scrolling through the first plurality of icons and the one or more recommended words occurs in accordance with one or more navigation commands received from a click wheel. The one or more navigation commands may include motion of a user contact with the click wheel.

The first plurality of icons and the one or more recommended words may constitute a first set. Scrolling through the first set may be sequential. The scrolling may wrap around from one end of the first set to another end of the first set. The first plurality of icons may include one or more jump icons. Clicking on a respective jump icon using the click wheel may result in a discontinuous jump from one position in the first set to another position.

In some embodiments, the method includes displaying a third tray. The third tray may include a second plurality of icons. The second plurality of icons may include numbers. The third tray may include a third region in the graphical user interface. The first plurality of icons, the one or more recommended words and the second plurality of icons may constitute a second set. Scrolling through the second set may be sequential. The scrolling may wrap around from one end of the second set to another end of the second set.

The method may include highlighting a respective icon in the first plurality of icons corresponding to a current position in the second tray. The method may include receiving a first user command. The first user command may correspond to selection of a respective icon in the first plurality of icons. In some embodiments, the first user command includes pushing down on the click wheel. In some embodiments, the first user command includes pushing down on a click wheel button, such as a button at the center of the click wheel.

The method may include displaying explanations of one or more functions corresponding to one or more symbols on the click wheel in the display.

The first plurality of icons may include a display adjustment icon. The one or more recommended words in the second tray may be replaced by icons corresponding to punctuation marks when a third user command corresponding to selection of the display adjustment icon is received a first time. Icons corresponding to punctuation marks may be replaced by the one or more recommended words when the third user command corresponding to selection of the display adjustment icon is received a second time. In some embodiments, additional icons corresponding to one or more sets of characters are displayed if the third user command corresponding to selection of the display adjustment icon is received a second time and if a first contact associated with the selection of the display adjustment icon is maintained for a time interval greater than a pre-determined value.

The method may include automatically adding a space after receiving a second user command corresponding to selection of at least one of the one or more recommended words. In some embodiments, the space may be automatically removed if a next user command received corresponds to the display adjustment icon.

The first plurality of icons may include at least one character icon corresponding to one or more sets of additional characters. A set of icons corresponding to at least one of the one or more sets of additional characters may be displayed when a fourth user command corresponding to selection of at least the one character icon is received. In some embodiments, the method includes displaying icons corresponding to pronunciation marks in accordance with the one or more characters that are selected by the user.

The one or more recommended words may be in accordance with a user word history. The user word history may include frequencies and times of usage. The one or more recommended words may be in accordance with a word prediction model. The word prediction model may be in accordance with one or more previously received user commands corresponding to one or more characters. The one or more recommended words may be displayed prior to receiving any user commands corresponding to selection of any icon in the first plurality of icons.

A scrolling rate may be in accordance with a speed and/or an acceleration of a second contact by a user with the click wheel. In some embodiments, the scrolling rate may be slower for a pre-determined angular displacement of the second contact just after the scrolling is started, just prior to stopping the scrolling, and when a direction of the scrolling is reversed, than for other angular displacements. In some embodiments, the scrolling rate is slower for a pre-determined time interval of the second contact just after the scrolling is started, just prior to stopping the scrolling, and when a direction of the scrolling is reversed, than for other time intervals.

In some embodiments, the method includes receiving a plurality of user commands using the click wheel. The plurality of user commands correspond to selection of multiple icons in the first plurality of icons. The selection occurs while contact with the click wheel is maintained.

The aforementioned methods may be performed by a portable electronic device having a touch-sensitive display with a graphical user interface (GUI), one or more processors, memory and one or more modules, programs or sets of instructions stored in the memory for performing these methods. In some embodiments, the portable electronic device provides a plurality of functions, including wireless communication.

Instructions for performing the aforementioned methods may be included in a computer program product configured for execution by one or more processors.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Embodiments of user interfaces and associated processes for using a device are described. In some embodiments, the device may be a portable communications device. The user interface may include a click wheel and/or touch screen. A click wheel is a physical user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel. For simplicity, in the discussion that follows, a portable communications device (e.g., a cellular telephone that may also contain other functions, such as PDA and music player functions) that includes a click wheel is used as an exemplary embodiment. It should be understood, however, that the user interfaces and associated processes may be applied to other devices, such as personal computers and laptops, that may include one or more other physical user-interface devices, such as a keyboard, a mouse and/or a joystick.

The device may support a variety of applications, such as a telephone, text messaging and a music player. The music player may be compatible with one or more file formats, such as MP3 and/or AAC. In an exemplary embodiment, the device includes an iPod music player (trademark of Apple Computer, Inc.).

The various applications that may be executed on the device may use at least one common physical user-interface device, such as the click wheel. One or more functions of the click wheel as well as corresponding information displayed on the device may be adjusted and/or varied from one application to the next and/or within a respective application. In this way, a common physical architecture (such as the click wheel) of the device may support the variety of applications with user interfaces that are intuitive and transparent.

Figure 1:
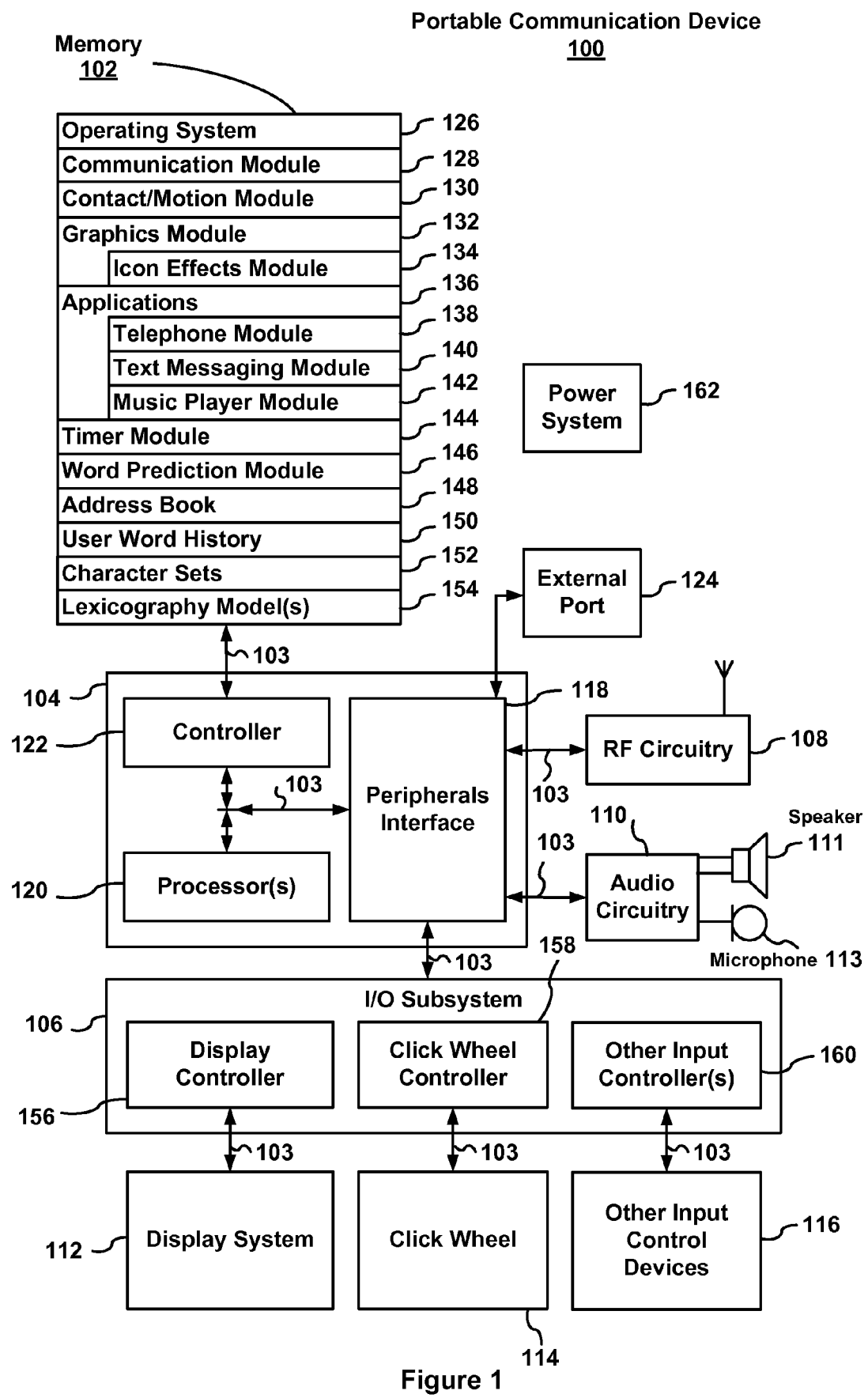
FIG. 1 is a block diagram illustrating an embodiment of an architecture for a portable communication device.

Attention is now directed towards embodiments of the device. FIG. 1 is a block diagram illustrating an architecture for a portable communication device 100, according to some embodiments of the invention. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, a display system 112 (which may include a touch screen), a click wheel 114, other input or control devices 116, and an external port 124. These components may communicate over one or more communication buses or signal lines 103. The device 100 may be any portable electronic device, including but not limited to a handheld computer, a tablet computer, a mobile phone, a media player, a personal digital assistant (PDA), or the like, including a combination of two or more of these items. In other embodiments, the device 100 may not be portable, such as a desktop personal computer.

It should be appreciated that the device 100 is only one example of a portable electronic device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

The memory 102 may include high speed random access memory and may also include non-volatile memory, such as one or more magnetic disk storage devices, flash memory devices, or other non-volatile solid state memory devices. In some embodiments, the memory 102 may further include storage remotely located from the one or more processors 120, for instance network attached storage accessed via the RF circuitry 108 or the external port 124 and a communications network (not shown) such as the Internet, intranet(s), Local Area Networks (LANs), Wide Local Area Networks (WLANs), Storage Area Networks (SANs) and the like, or any suitable combination thereof. Access to the memory 102 by other components of the device 100, such as the CPU 120 and the peripherals interface 118, may be controlled by the memory controller 122.

The peripherals interface 118 couples the input and output peripherals of the device to the CPU 120 and the memory 102. The one or more processors 120 run or execute various software programs and/or sets of instructions stored in the memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends electromagnetic waves. The RF circuitry 108 converts electrical signals to/from electromagnetic waves and communicates with communications networks and other communications devices via the electromagnetic waves. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be may be retrieved from and/or transmitted to the memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (headphone for one or both ears) and input (microphone).

The I/O subsystem 106 provides the interface between input/output peripherals on the device 100, such as the display system 112, the click wheel 114 and other input/control devices 116, and the peripherals interface 118. The I/O subsystem 106 may include a display controller 156, a click wheel controller 158 and one or more input controllers 160 for other input or control devices. The one or more input controllers 160 receive/send electrical signals from/to other input or control devices 160. The other input/control devices 160 may include physical buttons (e.g., push buttons, rocker buttons, etc.), dials, slider switches, sticks, and so forth.

The display system 112 provides an output interface and/or an input interface between the device and a user. The display controller 156 receives and/or sends electrical signals from/to the display system 112. The display system 112 displays visual output to the user. The visual output may include text, icons, graphics, video, and any combination thereof. In some embodiments, some or all of the visual output may correspond to user-interface objects, further details of which are described below.

In some embodiments, such as those that include a touch screen, the display system 112 also accepts input from the user based on haptic and/or tactile contact. In embodiments with a touch screen, the display system 112 forms a touch-sensitive surface that accepts user input. In these embodiments, the display system 112 and the display controller 156 (along with any associated modules and/or sets of instructions in the memory 102) detect contact (and any movement or breaking of the contact) on the display system 112 and converts the detected contact into interaction with user-interface objects, such as one or more soft keys, that are displayed on a touch screen. In an exemplary embodiment, a point of contact between a touch screen in the display system 112 and the user corresponds to one or more digits of the user.

In embodiments with a touch screen, the touch screen in the display system 112 may use LCD (liquid crystal display) technology, or LPD (light emitting polymer display) technology, although other display technologies may be used in other embodiments. A touch screen in the display system 112 and the display controller 156 may detect contact and any movement or breaking thereof using any of a plurality of touch sensitivity technologies, including but not limited to capacitive, resistive, infrared, and surface acoustic wave technologies, as well as other proximity sensor arrays or other elements for determining one or more points of contact with a touch screen in the display system 112. A touch-sensitive display in some embodiments of the display system 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen in the display system 112 displays visual output from the portable device 100, whereas touch sensitive tablets do not provide visual output. The touch screen in the display system 112 may have a resolution in excess of 100 dpi. In an exemplary embodiment, the touch screen in the display system may have a resolution of approximately 168 dpi. The user may make contact with the touch screen in the display system 112 using any suitable object or appendage, such as a stylus, finger, and so forth.

In some embodiments, in addition to touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen in the display system 112 or an extension of the touch-sensitive surface formed by the touch screen.

The device 100 may include a click wheel 114. A user may navigate among one or more graphical objects (henceforth referred to as icons) displayed in the display system 112 by rotating the click wheel 114 or by moving (e.g., angular displacement) of a point of contact with the click wheel 114. The click wheel 114 may also be used to select one or more of the displayed icons. For example, the user may press down on at least a portion of the click wheel 114 or an associated physical button. User commands and navigation commands provided by the user via the click wheel 114 may be processed by the click wheel controller 158 as well as one or more of the modules and/or sets of instructions in the memory 102.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the software components stored in the memory 102 may include an operating system 126, a communication module (or set of instructions) 128, a contact/motion module (or set of instructions) 130, a graphics module (or set of instructions) 132, one or more applications (or set of instructions) 136, a timer module (or set of instructions) 144, a word prediction module (or set of instructions) 146, an address book 148, a user word history 150, one or more character sets 152, and one or more lexicography models 154. The graphics module 132 may include an icon effects module (or set of instructions) 134. The applications module 136 may include a telephone module (or set of instructions) 138, a text messaging module (or set of instructions) 140 and/or a music player module (or set of instructions) 142.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.).

The contact/motion module 130 may detect contact with the click wheel 114 and/or a touch screen in the display system 112 (in conjunction with the display controller 156). The contact/motion module 130 includes various software components for performing various operations related to detection of contact, such as determining if contact has occurred, determining if there is movement of the contact and tracking the movement across the click wheel 114 and/or a touch screen in the display system 112, and determining if the contact has been broken (i.e., if the contact has ceased). Determining movement of the point of contact may include determining speed (magnitude), velocity (magnitude and direction), and/or an acceleration (including magnitude and/or direction) of the point of contact. In some embodiments, the contact/motion module 130 and the display controller 156 also detects contact on a touchpad.

The graphics module 132 includes various known software components for rendering and displaying graphics on the display system 112. Note that the term "graphics" includes any object that can be displayed to a user, including without limitation text, web pages, icons (such as user-interface objects including soft keys), digital images, videos, animations and the like.

In some embodiments, the graphics module 132 includes the icon effects module 134. The icon effects module 134 may modify a displayed position of one or more icons on the display system 112 (in conjunction with the display controller 156) based on an animation sequence.

In addition to the telephone module 138, the text messaging module 140 and/or the music player module 142, the one or more applications 136 may include any applications installed on the device 100, including without limitation, a browser, the address book 148, contact list, email, instant messaging, word processing, keyboard emulation, widgets, JAVA-enabled applications, encryption, digital rights management, voice recognition, voice replication, location determination capability (such as that provided by the global positioning system (GPS)), etc. A data structure associated with the address book 148 is discussed further below with reference to FIG. 7.

In conjunction with the RF circuitry 108, the audio circuitry 110, the speaker 111, the microphone 113, the display system 112, the display controller 156, the click wheel 114 and/or the click wheel controller 158, the telephone module 138 may be used to enter a sequence of characters corresponding to a telephone number, access one or more telephone numbers in the address book 148, modify a telephone number that has been entered, dial a respective telephone number, conduct a conversation and disconnect or hang up when the conversation is completed. Embodiments of user interfaces and associated processes corresponding to the telephone module 138 are described further below with reference to FIGS. 3-6.

In conjunction with the display system 112, the display controller 156, the click wheel 114 and/or the click wheel controller 158, the text messaging module 140 may be used to enter a sequence of characters corresponding to a text message, to modify previously entered characters, to transmit a respective text message (for example, using a Short Message Service or SMS protocol), to receive text messages and to view received text messages. In some embodiments, transmitted and/or received text messages may include graphics, photos, audio files, video files and/or other attachments as are supported in a Multimedia Message Service (MMS) and/or an Enhanced Messaging Service (EMS). Embodiments of user interfaces and associated processes corresponding to the text messaging module 140, and more generally, to text entry and communication are described further below with reference to FIGS. 8-10, 12 and 13.

In conjunction with the display system 112, the display system controller 156, the click wheel 114, the click wheel controller 158, the audio circuitry 110, the speaker 111 and/or the microphone 113, the music player module 142 allows the user to play back recorded music stored in one or more files, such as MP3 or AAC files. In some embodiments, the device 100 may include the functionality of an MP3 player, such as an iPod (trademark of Apple Computer, Inc.). The device 100 may, therefore, include a 36-pin connector that is compatible with the iPod.

The timer module 144 may provide a time reference and/or time stamps for user commands received by the device 100, for example, using the click wheel 114 and the click wheel controller 158.

The word prediction module 146 may be used in conjunction with one or more of the applications 136, such as the text messaging module 140. The word prediction module 146 may suggest one or more words or symbols (such as punctuation marks, pronunciation marks or spaces) in accordance with a context. The context may be based on one or more of the lexicography models 154 (for example, grammatical and/or syntax rules associated with one or more languages) and/or a user word history 150. The context may include one or more previously entered words, characters, and/or symbols. The context may depend on which of the applications 136 is being used. For example, there may be different contexts for an email application as opposed to a word processing application.

The user word history 150 may include static content (such as that associated with a dictionary) and/or dynamic content (such as that associated with characters, symbols and/or words that are routinely and/or recently used by the user). The user word history 150 may include a static dictionary built up by scanning a user's address book, emails, and other documents. The user word history 150 may include weighted scores or probabilities for predicted words based on a set of characters, symbols and/or words that are provided by the user to the device 100, for example, using the click wheel 114 and the click wheel controller 158. The user word history 150 may also include use statistics (e.g., time of use and/or frequency of use) of one or more characters, symbols and/or words that are provided by the user. The user word history 150 is discussed further below with reference to FIGS. 14A and 14B.

The character sets 152 may include one or more sets of characters corresponding to numbers, letters and/or symbols. The letters and/or symbols may correspond to one or more languages. The character sets 152 may be used by one or more of the applications 136, such as the text messaging module 140.

In some embodiments, the device 100 may include one or more optional optical sensors (not shown), such as CMOS or CCD image sensors, for use in imaging applications.

In some embodiments, the device 100 is a device where operation of a predefined set of functions on the device is performed exclusively through a touch screen in the display system 112 and/or a touchpad. By using a touch screen and/or a touchpad as the primary input/control device for operation of the device 100, the number of physical input/control devices (such as push buttons, dials, and the like) on the device 100 may be reduced. In one embodiment, the device 100 includes a touch screen, a touchpad, a push button for powering the device on/off and locking the device, a volume adjustment rocker button and a slider switch for toggling ringer profiles. The push button may be used to turn the power on/off on the device by depressing the button and holding the button in the depressed state for a predefined time interval, or may be used to lock the device by depressing the button and releasing the button before the predefined time interval has elapsed. In an alternative embodiment, the device 100 also may accept verbal input for activation or deactivation of some functions through the microphone 113.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

In some embodiments, the device 100 is a device where operation of a predefined set of functions on the device is performed exclusively or at least in part through the click wheel 114. By using the click wheel 114 as the primary input/control device for operation of the device 100, the number of other physical input/control devices (such as push buttons, dials, and the like) on the device 100 may be reduced.

Figure 2:
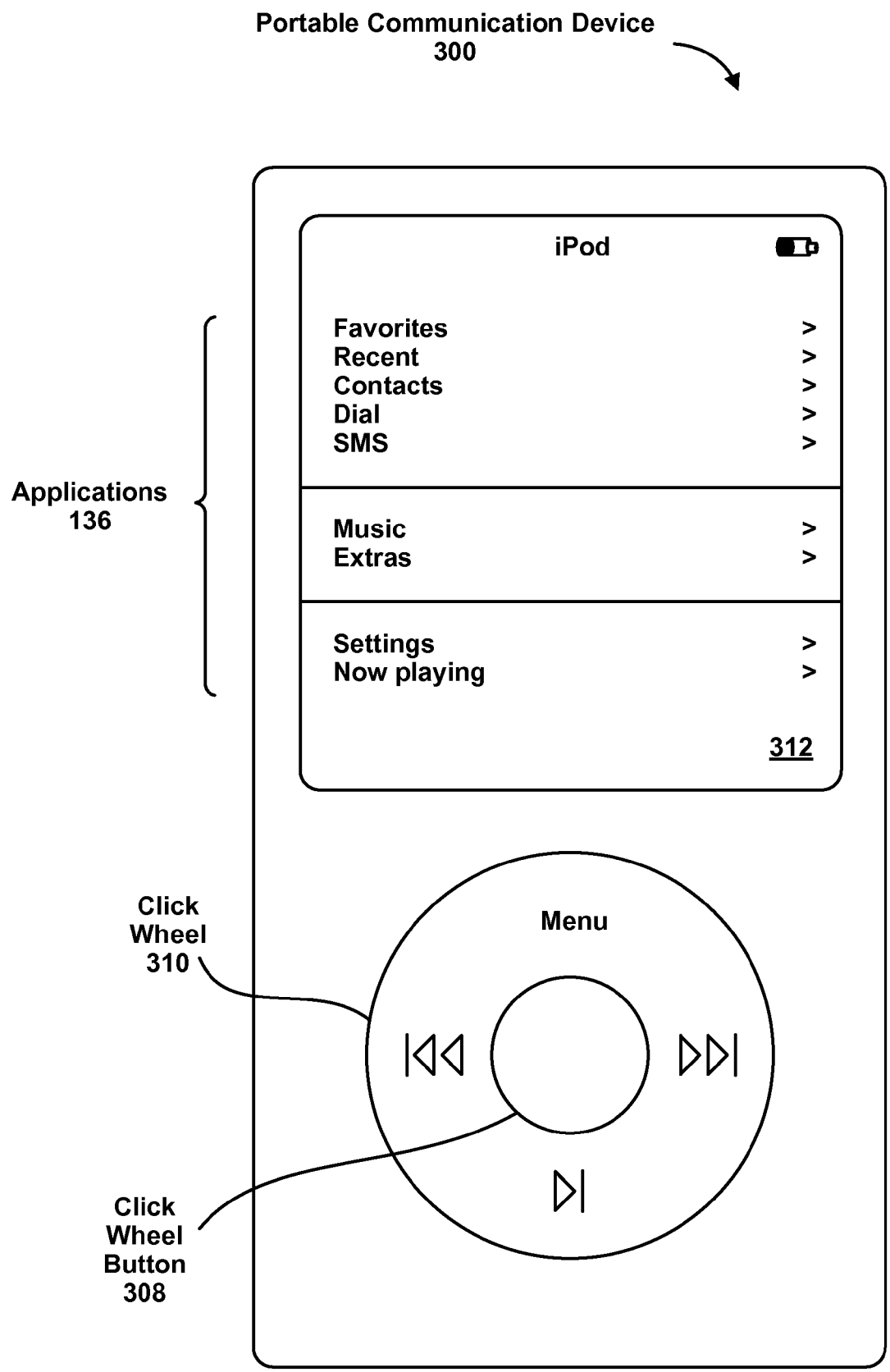
FIG. 2 is a schematic diagram illustrating an embodiment of a user interface for a portable communication device.

Attention is now directed towards embodiments of user interfaces and associated processes that may be implemented on the device 100. FIG. 2 is a schematic diagram illustrating an embodiment of a user interface for a portable communication device 300. The device 300 includes a click wheel 310 and a display 312. The click wheel constitutes a physical interface for receiving user commands (such as selection of one of more items and/or icons that are displayed on the display 312) and/or navigation commands (which may, for example, control scrolling through the items and/or icons that are displayed on the display 312). The user may use the click wheel 310 by touching it (making a point of contact) and then moving the point of contact while maintaining contact. Such angular displacement may indicate a navigation command to scroll through the items and/or icons that are displayed on the display 312. By pressing down on the click wheel 310, or a click wheel button 308 (e.g., at the center of the click wheel), the user may select one or more items and/or icons that are displayed on the display 312. Thus, a pressing down gesture may indicate a user command corresponding to selection.

The device 300 may display a menu or hierarchy of the applications 136 that may be executed or run on the device 300. Such a menu is illustrated in FIG. 2 in the display 312. The displayed icons for the applications 136 include 'Favorites' for popular applications for this user, 'Recent' for calls that have been made, answered, and/or missed within a first pre-determined value (such as the last day, week or month), 'Contacts' (which corresponds to the address book 148 in FIG. 1), 'Dial' (which corresponds to the telephone module 138 in FIG. 1) and 'SMS' (which corresponds to the text messaging module 140 in FIG. 1). The 'Music', 'Extras', 'Settings' and 'Now playing' icons may correspond to the music player module 142 (FIG. 1). The arrow icons on the right-hand side of the display 312 may provide a visual clue to the user that selection of a respective icon will move down through the menu hierarchy down to the corresponding application (with a commensurate modification of the information displayed in the display 312). The display 312 may also include an icon, such as that shown in the upper right-hand corner, that indicates a remaining stored power level for the device 300.

As discussed previously, if the user selects the 'Dial' icon in the display 312, the telephone module 138 (FIG. 1) may be executed. Embodiments of telephone user interfaces for the portable communication device 300 that correspond to the telephone module 138 (FIG. 1) are illustrated in FIG. 3A-3D. While the device 300 in these figures has been illustrated with certain components (including displayed information) and a particular arrangement of these components, it should be understood that there may be fewer or more components, two or more components may be combined, and positions of one or more components may be changed.

Figure 3A:
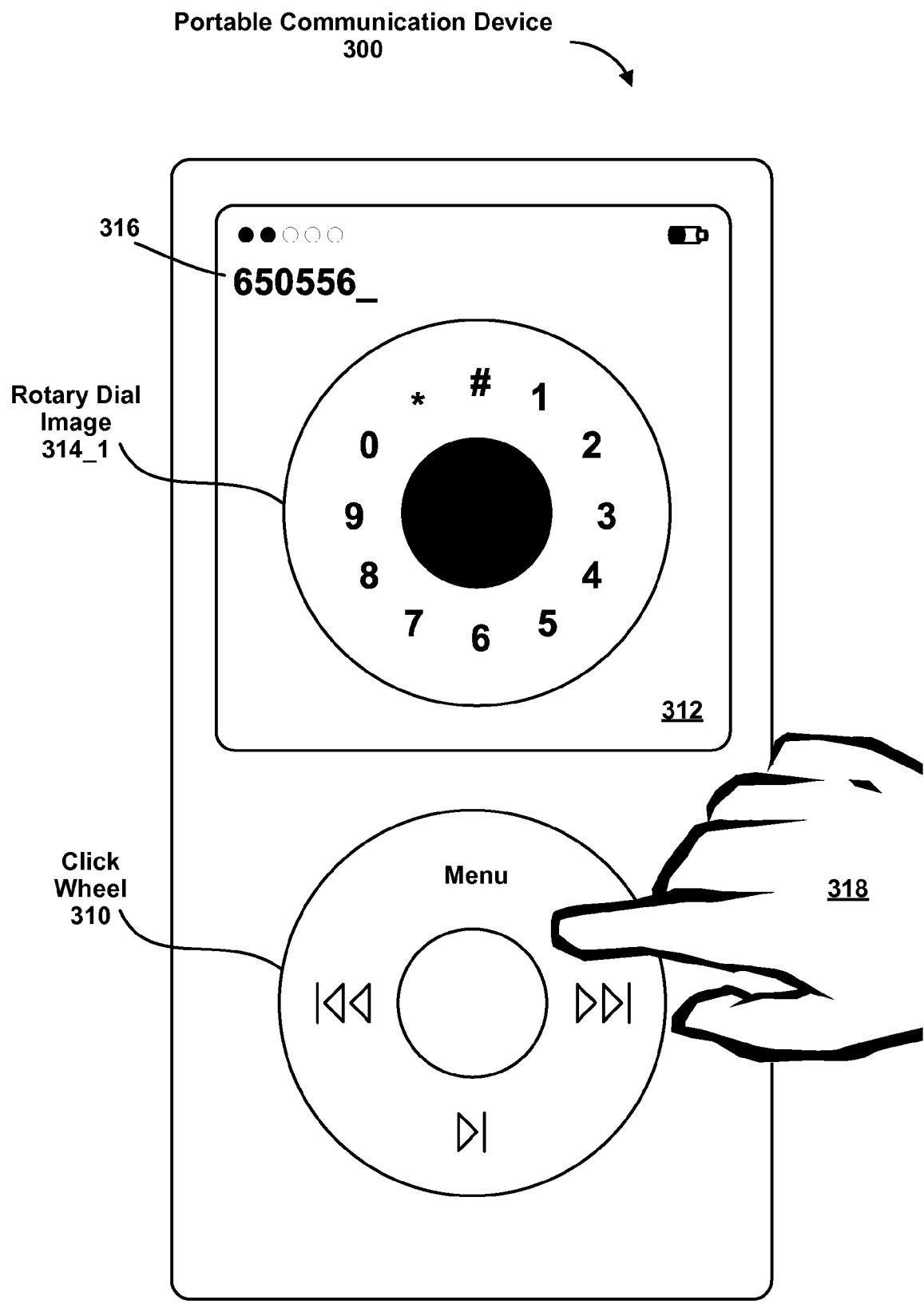
FIG. 3A is a schematic diagram illustrating an embodiment of a telephone user interface for a portable communication device.

As shown in FIG. 3A, if a user touches the click wheel 310, for example with a finger 318 (not drawn to scale in the figure), when the telephone module 138 (FIG. 1) is running, an icon or a set of icons corresponding to a rotary dial image 314_1 may be displayed in the display 312. Prior to the user touching the click wheel 310, no image is displayed or an image other than a rotary dial image is displayed (e.g., the menu illustrated in FIG. 2, a sleep mode image, or an image corresponding to another application may be displayed). The rotary dial image 314_1 may correspond to a character entry mode of operation in the telephone module 138 (FIG. 1), e.g., a mode of operation where the user may enter in characters, such as numbers, that correspond to a telephone number the user wishes to dial. In some embodiments, the contact is maintained for more than a second pre-determined time interval prior to the device 100 transitioning to the character entry mode of operation. The second pre-determined time interval may be 0.5, 1 or 2 s.

The rotary dial image 314_1 may include a plurality of icons arranged proximate to a periphery of the rotary dial image. The plurality of icons may include numbers. As shown in FIG. 3A, in some embodiments, the rotary dial image includes the numbers 1-9 arranged as on a clock face, with the 10, 11, and 12 o'clock positions replaced with 0, *, and #, respectively. In other embodiments, the displayed icons are arranged in a pattern corresponding to a conventional rotary dial interface for a telephone.

As shown in FIG. 3A, the display 312 may include icons, such as those shown in the upper left-hand corner, that indicate a signal strength of signals used to communicate with a network, such as a cellular telephone network. The display 312 may include icons 316 corresponding to a sequence of one or more displayed icons that have been previously selected by the user. These icons 316 may be numbers in a set of numbers, e.g., a telephone number, that the user wishes to dial. The selection process is described further below.

Figure 3B:
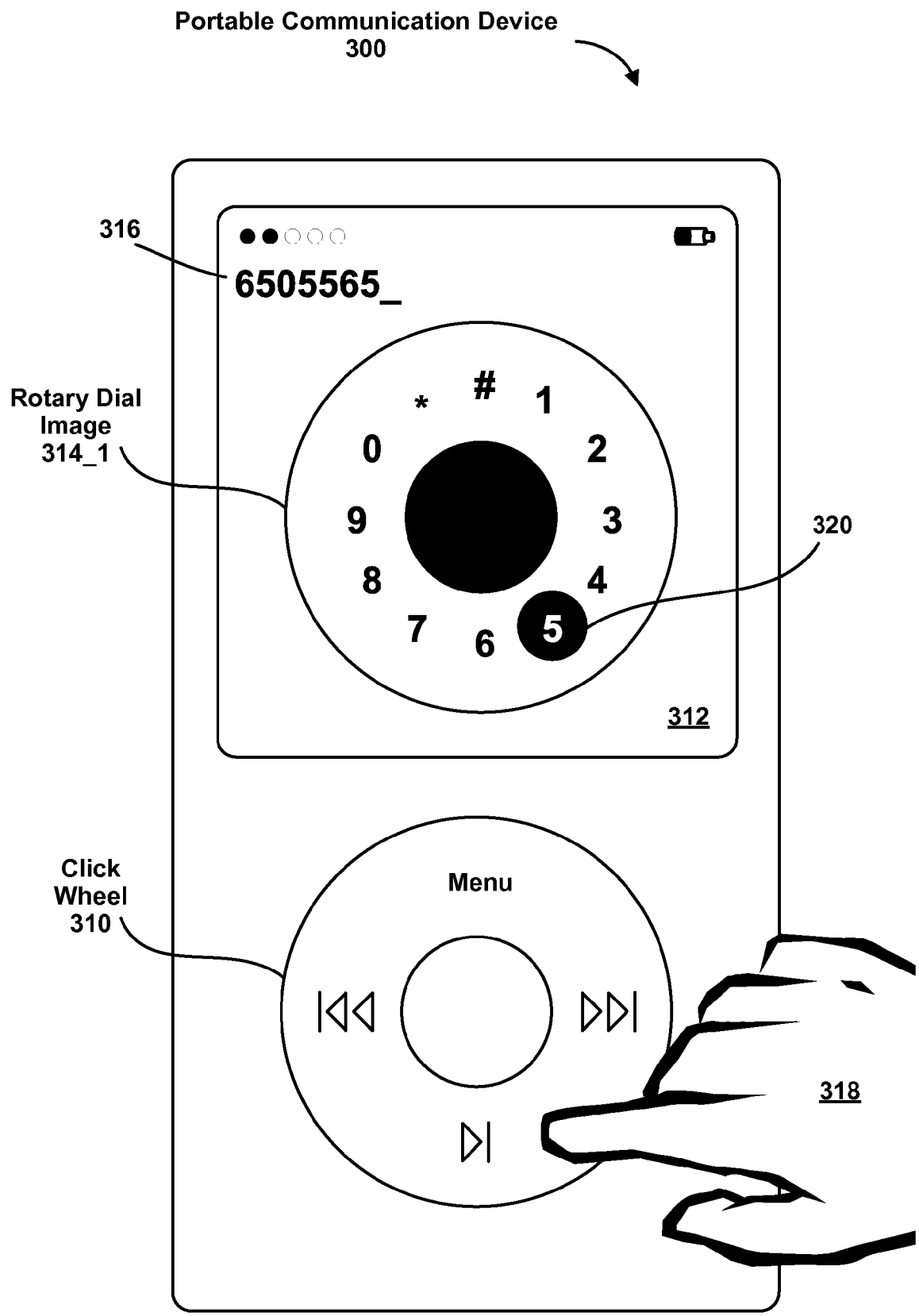
FIG. 3B is a schematic diagram illustrating an embodiment of a telephone user interface for a portable communication device.

By moving a point of contact around at least a portion of the click wheel 310, the user may provide navigation commands to the device 300. As discussed previously, the navigation commands may correspond to scrolling through the icons displayed on the display 312. For the rotary dial image 314_1, the scrolling may be around the circumference of the rotary dial image 314_1. For example, the user may scroll through the icons corresponding to numbers. As shown in FIG. 3B, in some embodiments a respective icon 320, which corresponds to a current position, may be highlighted. In some embodiments, there is an absolute angular relationship between contact points on the clickwheel 310 and icon positions on the rotary dial image 314 (e.g., the 3 o'clock position on the clickwheel 310 corresponds to the 3 o'clock position in the rotary dial image 314, the 6 o'clock position on the clickwheel 310 corresponds to the 6 o'clock position in the rotary dial image 314, etc.).

In some embodiments, in order for the rotary dial image 314_1 to continue to be displayed (e.g., the device 300 remains in the character entry mode of operation) the user maintains the contact with the click wheel 314 even while moving around at least a portion of the click wheel 314_1 to provide navigation commands. In some embodiments, the rotary dial image 314_1 continues to be displayed even if the user breaks contact with the click wheel 314 if the break in contact is for less than a third pre-determined amount of time or time interval. For example, for time intervals less than 0.5, 1 or 2 s. This functionality may allow the user to break contact with the click wheel 314 while moving around at least a portion of the click wheel 314 (e.g., while providing navigation commands). If the user breaks contact with the click wheel 314, the navigation commands may be determined based on intervals where there is a point of contact (e.g., in a time interval preceding the breaking of contact and in a time interval after the contact has been reestablished).

The user may select the respective icon 320 (i.e., provide the user command corresponding to selection) by pressing down on the click wheel 310 and/or by pressing on the button 308 (FIG. 2). When the respective icon is selected, a corresponding character or number may be added to the displayed sequence of selected icons 316.

Figure 3C:
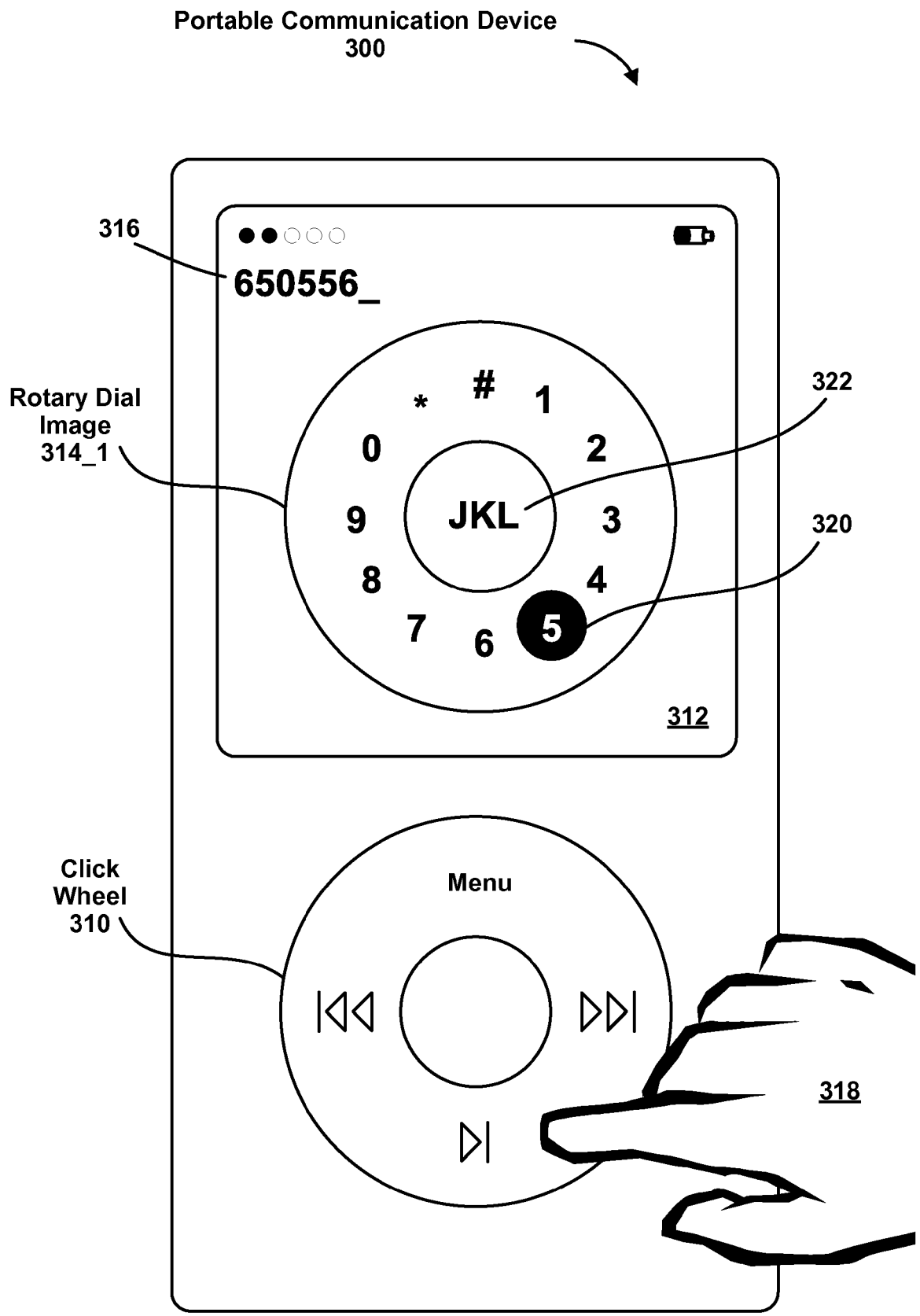
FIG. 3C is a schematic diagram illustrating an embodiment of a telephone user interface for a portable communication device.
Figure 3D:
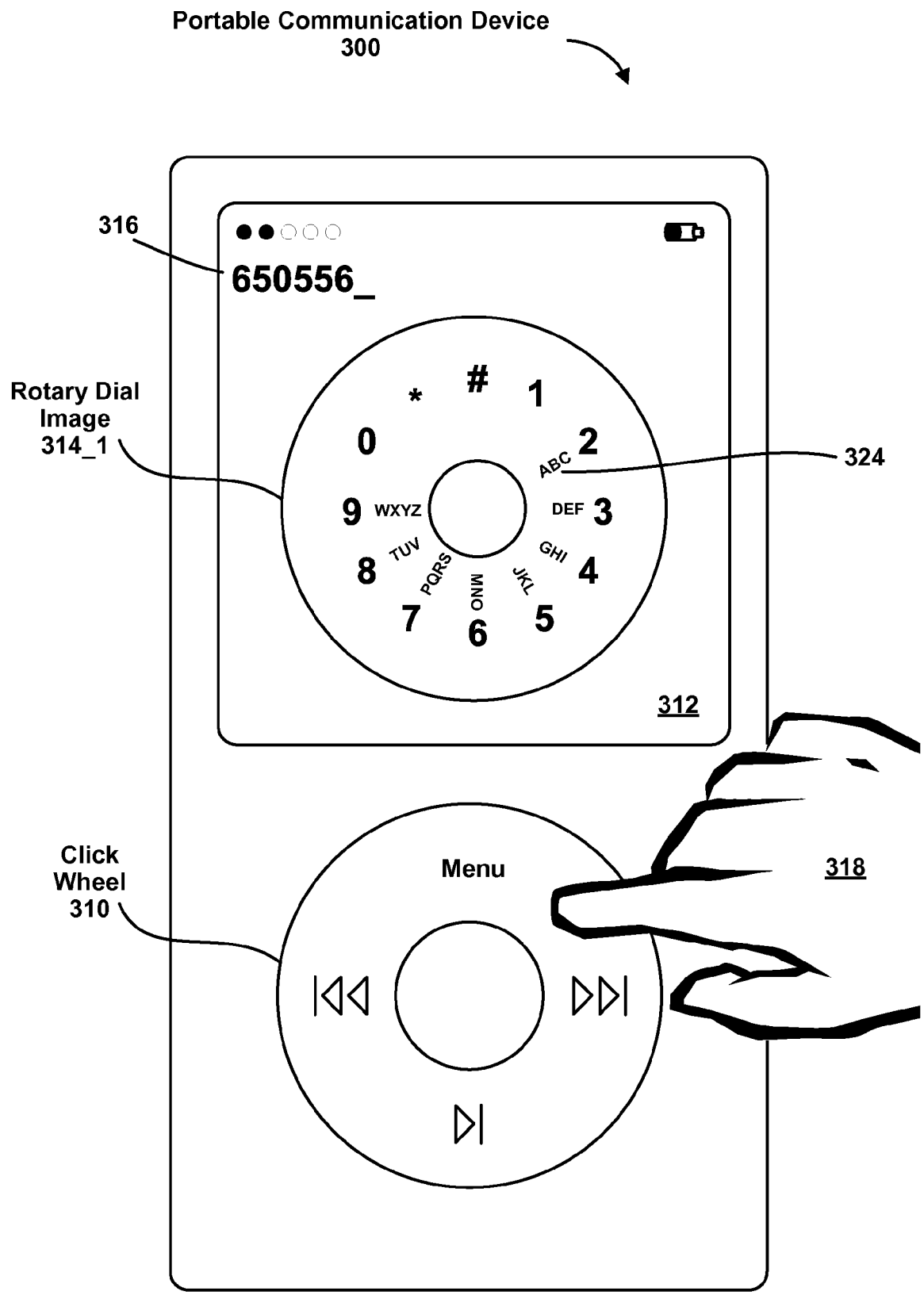
FIG. 3D is a schematic diagram illustrating an embodiment of a telephone user interface for a portable communication device.

As shown in FIG. 3C, in some embodiments one or more icons 322 corresponding to one or more letters associated with the respective icon 320 may be displayed in a central region of the rotary dial image 314_1. As shown in FIG. 3D, in some embodiments sets of one or more icons, such as icon 324, corresponding to one or more letters associated with at least a subset of the plurality of icons in the rotary dial image 314_1 may be displayed along a radial direction of the rotary dial image 314_1.

While embodiments of user interfaces for the character entry mode of operation the device 300 have been described, in other embodiments (not shown) the user may use the device 300 to access the address book 148 (FIG. 1) to select one or more telephone numbers that he or she wishes to dial.

Figure 4A:
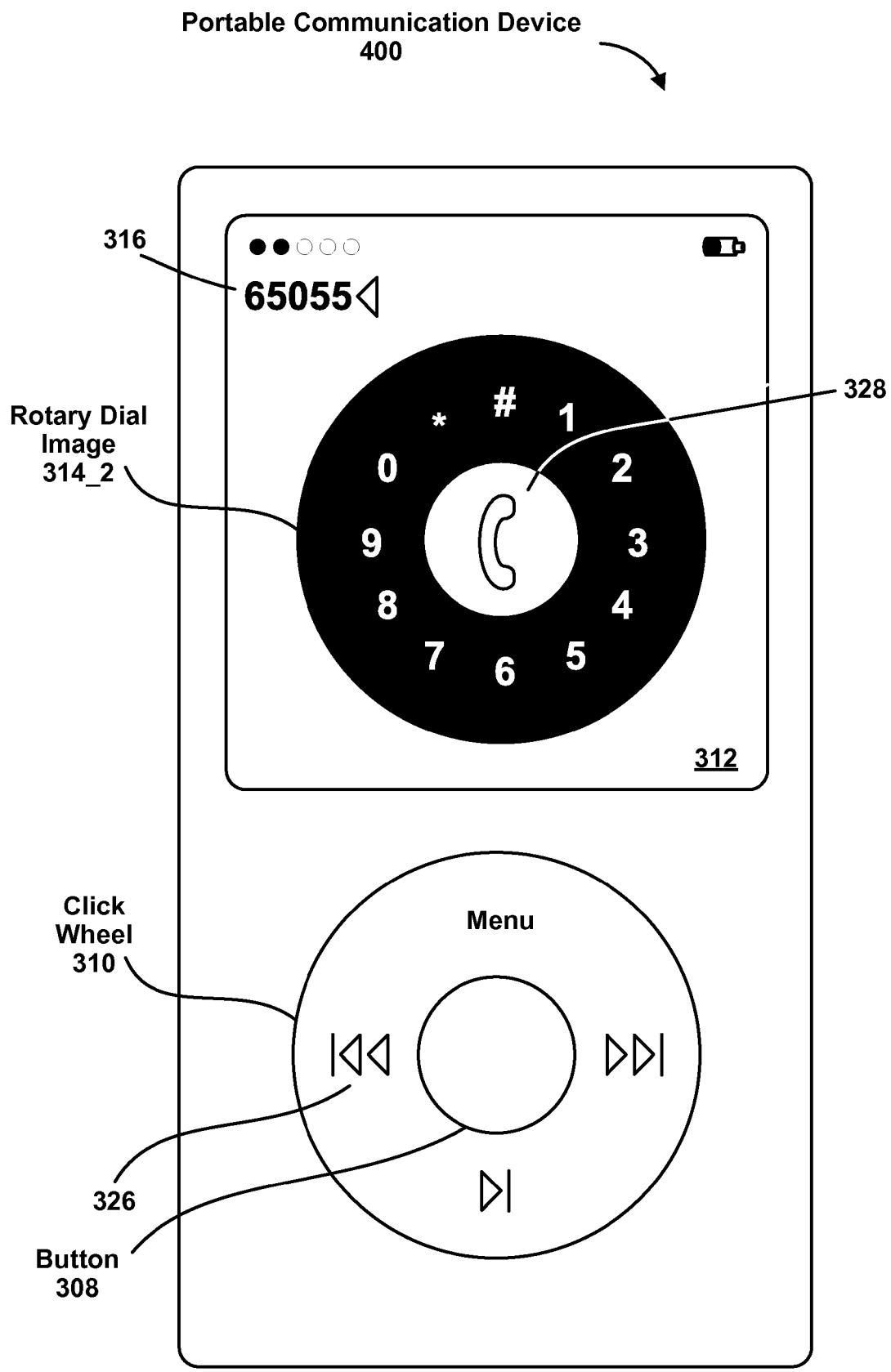
FIG. 4A is a schematic diagram illustrating an embodiment of a telephone user interface for a portable communication device.
Figure 4B:
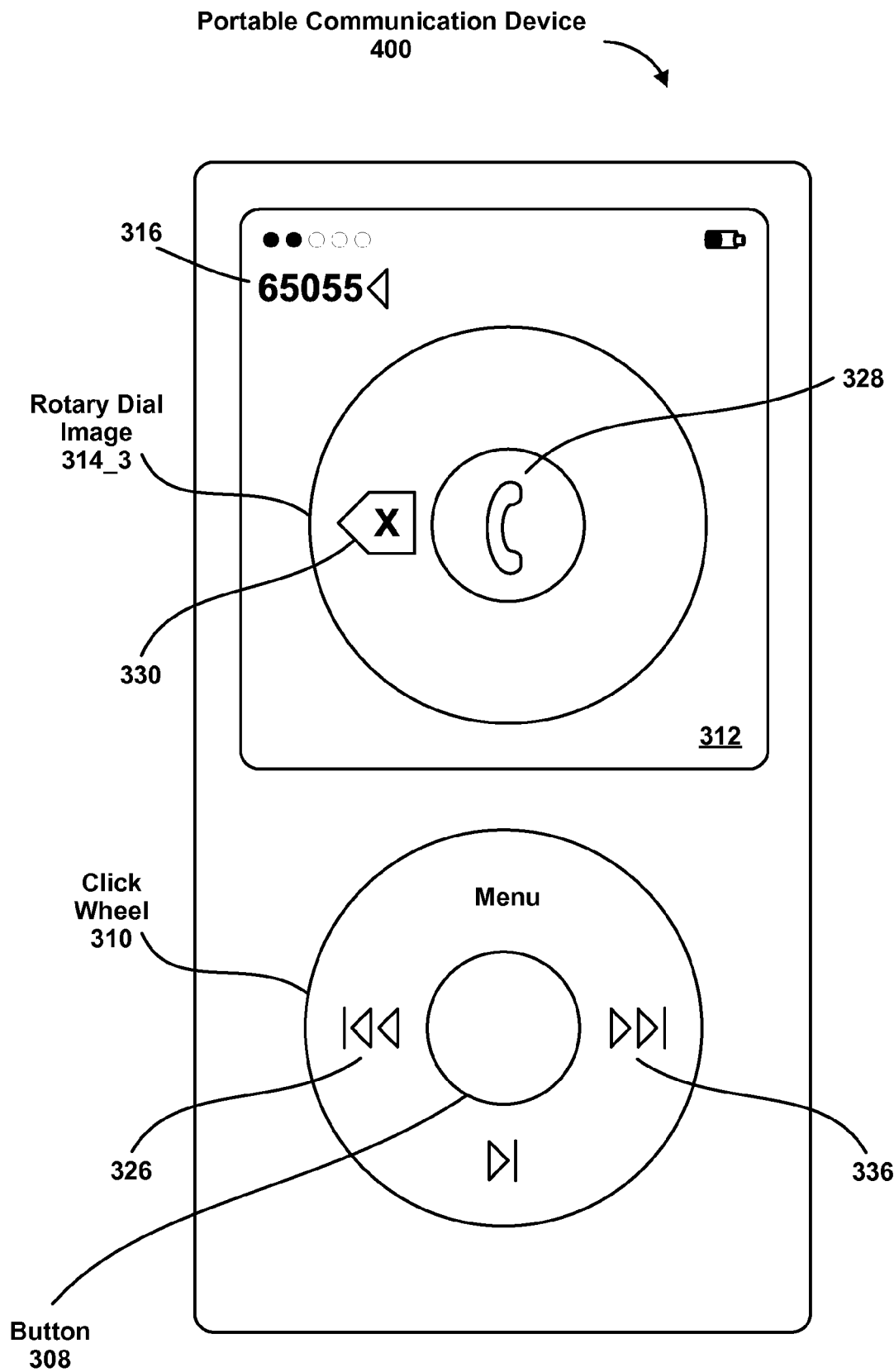
FIG. 4B is a schematic diagram illustrating an embodiment of a telephone user interface for a portable communication device.

When a user has completed entering in a telephone number that he or she wishes to dial, or if the user makes a mistake while entering in the telephone number that he or she wishes to correct, the user may transition to a character correction mode of operation in the telephone module 138 (FIG. 1). Embodiments of telephone user interfaces for a portable communication device 400 that correspond to this mode of operation are illustrated in FIGS. 4A and 4B. While the device 400 in these figures has been illustrated with certain components (including displayed information) and a particular arrangement of these components, it should be understood that there may be fewer or more components, two or more components may be combined, and positions of one or more components may be changed.

The user may transition to the character correction mode of operation by breaking contact with the click wheel 314 or by breaking contact with the click wheel 314 for more than the third pre-determined time interval. When the device 300 transitions to the character correction mode of operation, a new icon or set of icons corresponding to rotary dial image 314_2 may be displayed on the display 312. The rotary dial image 314_2 has different shading or coloring than the rotary dial image 314_1 (FIGS. 3A-3D) to indicate to the user that the mode of operation has changed.

In some embodiments, the transition from the display of the rotary dial image 314_1 (FIGS. 3A-3D) to the rotary dial image 314_2 is continuous. For example, the rotary dial image 314_1 (FIGS. 3A-3D) may be faded out and the rotary dial image 314_2 may be faded in over a fourth pre-determined time interval. The fourth pre-determined time interval may be 0.5, 1 or 2 s. In some embodiments, the fourth time interval is a time interval greater than a pre-determined value.

In the character correction mode of operation, the user may provide a user command to the device 400 that indicates one or more characters corresponding to one or more previously selected icons should be removed. For example, the user may press on the click wheel 310 over or proximate to a symbol 326 that corresponds to a delete function. When a character is deleted the displayed icons 316 may be modified to indicate the change. As shown in FIG. 4B, in some embodiments an icon or set of icons corresponding to a rotary dial image 314_3 may include icon 330 that provides a visual clue to the user as to the functionality corresponding to the symbol 326 on the click wheel 310.

After deleting one or more previously selected characters, the user may make contact with the click wheel for at least a fifth pre-determined time interval in order to return to the character entry mode of operation. The fifth pre-determined time interval may be 0.5, 1 or 2 s. In some embodiments, the user may return to the character entry mode of operation by clicking on a predetermined location on the clickwheel 310, such as symbol 336 on the clickwheel 310. In some embodiments, the user may return to the character entry mode of operation by moving a point of contact a predetermined amount or angle on the clickwheel 310. In this mode, the user may select one or more additional icons to complete the sequence of characters corresponding to the telephone number that the user wishes to dial. In some embodiments (not shown in FIG. 4B), rotary dial image 314_3 may include an icon that provides a visual clue to the user as to the functionality corresponding to the symbol 336 on the click wheel 310, analogous to the visual cue that icon 330 provides for symbol 326.

Figure 5:
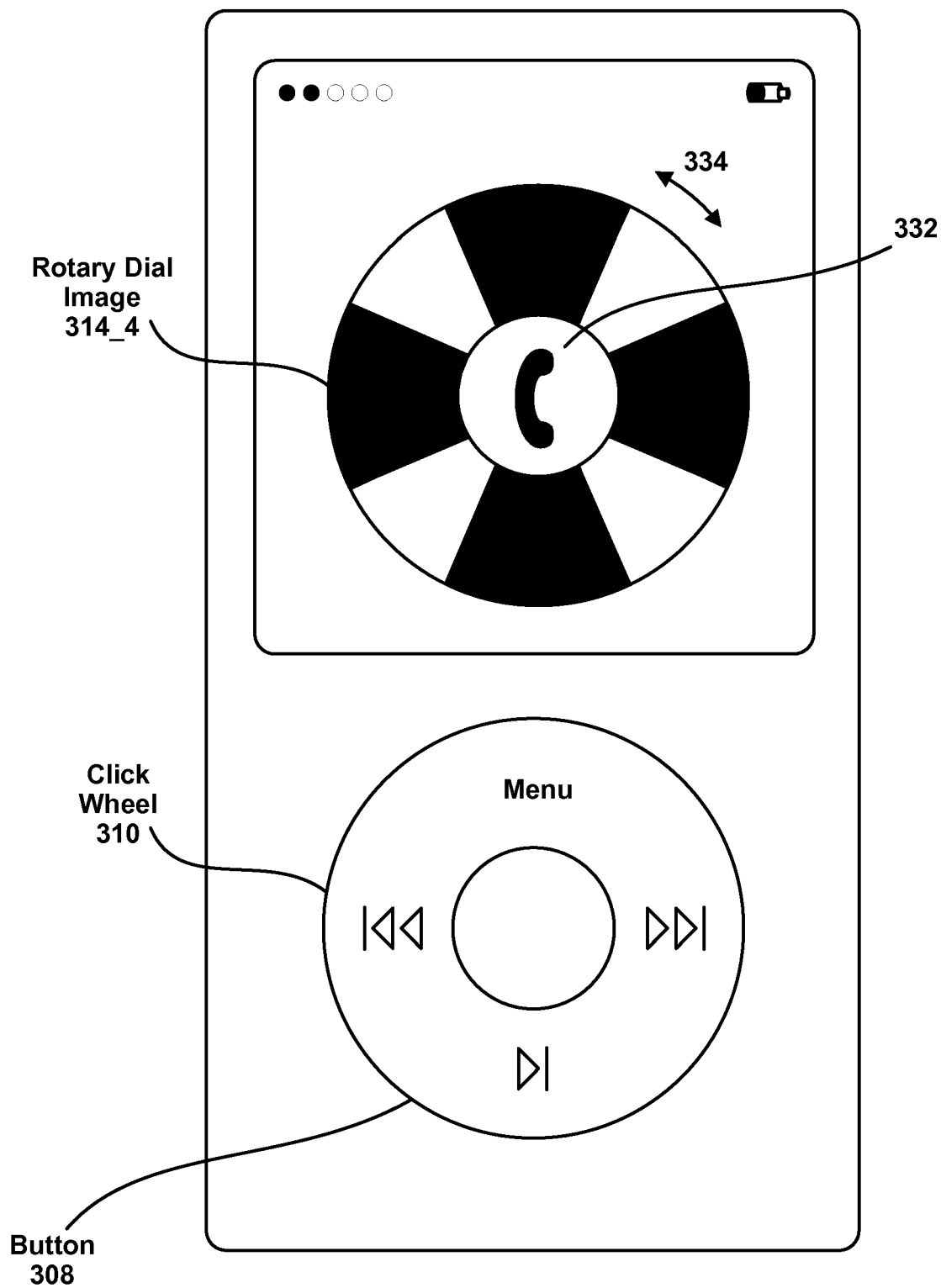
FIG. 5 is a schematic diagram illustrating an embodiment of a telephone user interface for a portable communication device.

If the user does not need to delete any characters or does not need to select any additional characters after deleting one or more characters, the user may provide a user command to the device 400 corresponding to dialing the previously entered telephone number by pressing on the button 308. An icon 328 in the display 312 may be displayed to provide the user a visual clue as to the current functionality of the button 308. In some embodiments, one or more additional icons corresponding to one or more functions of the click wheel 310 may be displayed on the display 312 in the device 300 (FIGS. 3A-3B), the device 400 (FIGS. 4A-4B) and/or a device 500 (FIG. 5).

When the user presses on the button 308, the device 400 may dial the selected telephone number. The device 400, therefore, may enter a dialing mode of operation. An embodiment of telephone user interfaces for the portable communication device 500 that correspond to this mode of operation is illustrated in FIG. 5. While the device 500 has been illustrated with certain components (including displayed information) and a particular arrangement of these components, it should be understood that there may be fewer or more components, two or more components may be combined, and positions of one or more components may be changed.

During the dialing mode of operation, an icon or a set of icons corresponding to a rotary dial image 314_4 may be displayed. The rotary dial image 314_4 may be modified during the dialing. The modification may be in accordance with an animation sequence. For example, the rotary dial image 314_4 may be rotated clockwise or counter clockwise. In some embodiments, music, such as a portion of a music file may be played during the dialing.

In some embodiments, the user may adjust a volume of the speaker 111 (FIG. 1) by moving a point of contact with the click wheel 310 approximately clockwise and/or counter clockwise around at least a portion of the click wheel 310. The device 500 may remain in the dialing mode of operation even if the user maintains the contact with the click wheel 310 for more than a pre-determined time interval, such as the fifth pre-determined time interval.

The rotary dial image 314_4 may include an icon 332 that provides a visual clue to the user as to how he or she should disconnect the telephone call when he or she wishes to. In particular, the icon 322 indicates that by providing a user command (e.g., by pressing on the button 308) the user may disconnect or end the telephone call. After a respective telephone call is ended, the device 500 may return to the character correction mode of operation.

Figure 6:
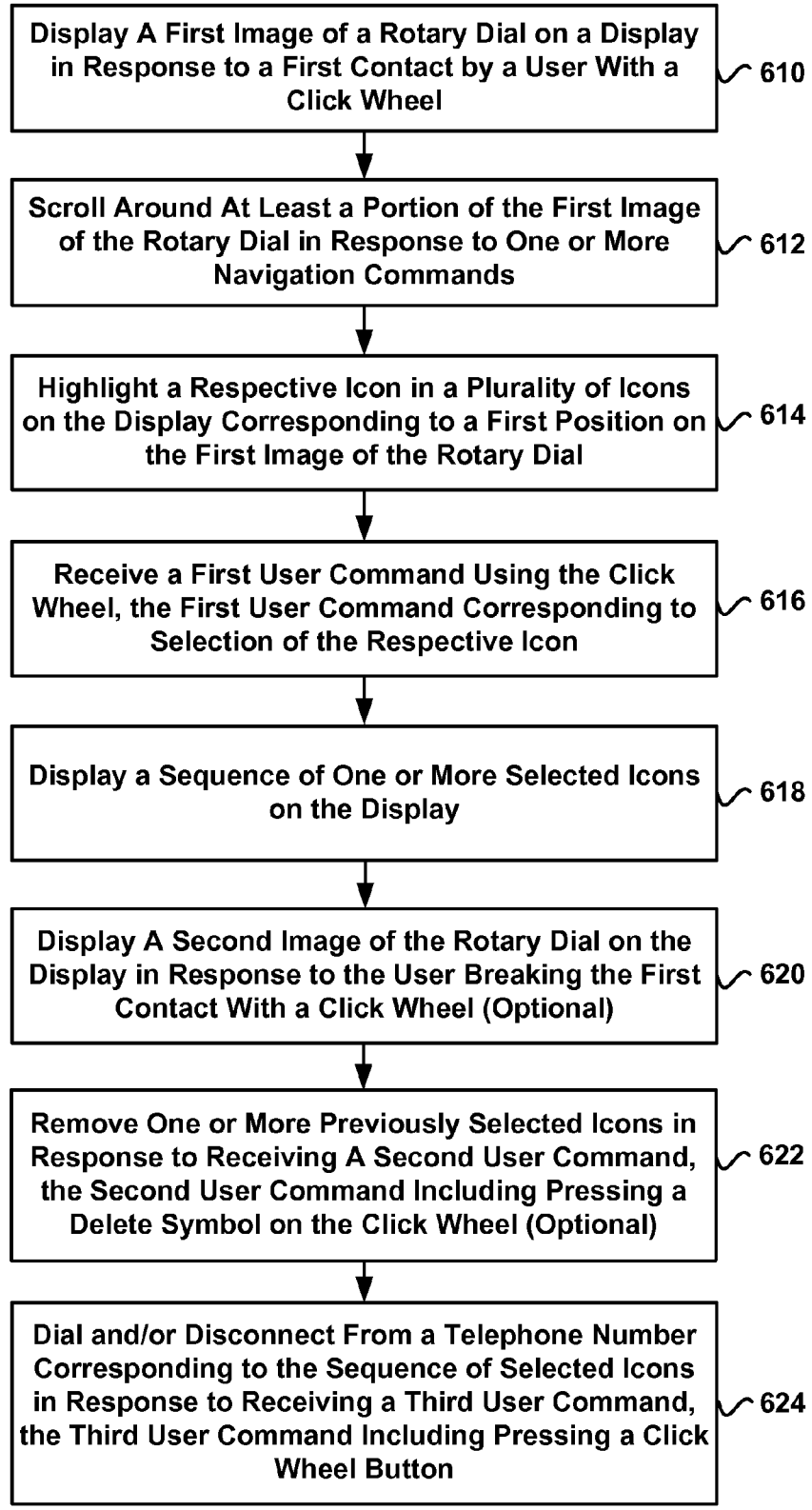
FIG. 6 is a flow diagram of an embodiment of a telephone number dialing process.

FIG. 6 is a flow diagram of an embodiment of a telephone number dialing process 600. While the telephone number dialing process 600 described below includes a number of operations that appear to occur in a specific order, it should be apparent that the process 600 can include more or fewer operations, which can be executed serially or in parallel (e.g., using parallel processors or a multi-threading environment), an order of two or more operations may be changed and/or two or more operations may be combined into a single operation.

A first image of a rotary dial on a display is displayed in response to a first contact by a user with a click wheel (610). At least a portion of the first image of the rotary dial is scrolled around in response to one or more navigation commands (612). A respective icon in a plurality of icons corresponding to a first position on the first image of the rotary dial is highlighted (614). A first user command corresponding to selection of the respective icon is received using the click wheel (616). A sequence of one or more selected icons is displayed on the display (618). A second image of the rotary dial is optionally displayed on the display in response to the user breaking the first contact with the click wheel (620). One or more previously selected icons are optionally removed in response to receiving a second user command (622). The second user command may include pressing a delete symbol on the click wheel. A telephone number corresponding to the sequence of selected icons is dialed or disconnected in response to receiving a third user command (624). The third user command includes pressing a click wheel button (e.g., 308).

Figure 7:
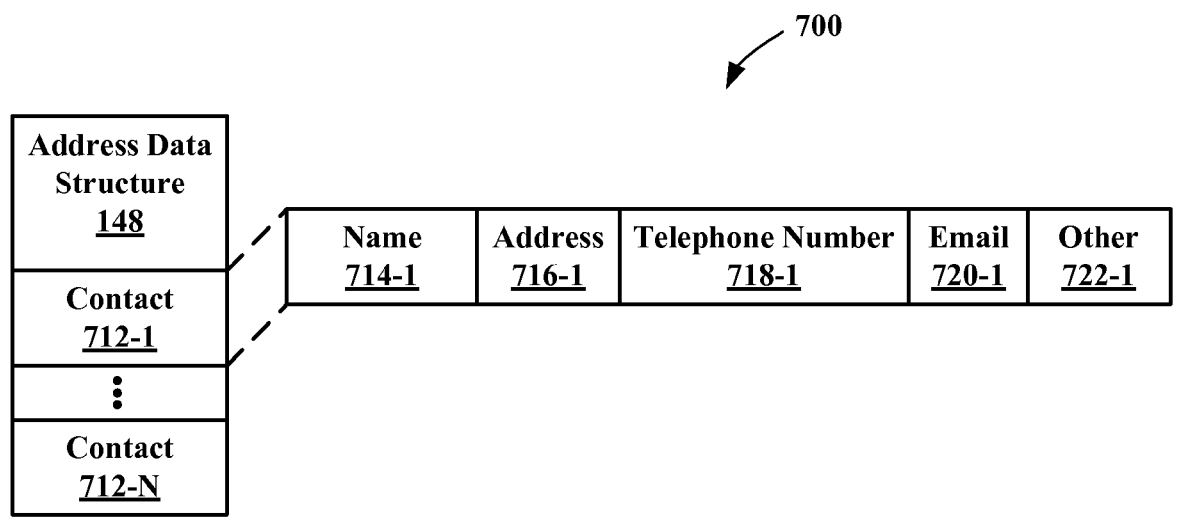
FIG. 7 is a block diagram illustrating an embodiment of an address book data structure.

Attention is now directed towards embodiments of data structures that may be used in implementing the telephone module 138 (FIG. 1) and/or other applications 136 (FIG. 1). FIG. 7 is a block diagram illustrating an embodiment of an address book data structure 700. The address book 148 may include multiple contacts 712. A respective contact, such as the contact 712-1, may include one or more names 714-1, one or more addresses 716-1, one or more telephone numbers 718-1, one or more email addresses 720-1, as well as other information 722-1. In some embodiments the address book data structure 700 may include fewer or more components. Two or more components may be combined and an order of two or more components may be changed.

Attention is now directed towards additional embodiments of user interfaces and associated processes that may be implemented on the device 100 (FIG. 1). As discussed previously, if the user selects the 'SMS' icon in the display 312 (FIG. 2), the text messaging module 140 (FIG. 1) may be executed. Embodiments of text messaging user interfaces for a portable communication device 800 that correspond to the text messaging module 140 (FIG. 1) are illustrated in FIG. 8A-8E and 9A-9B. While the device 800 in these figures has been illustrated with certain components (including displayed information) and a particular arrangement of these components, it should be understood that there may be fewer or more components, two or more components may be combined, and positions of one or more components may be changed.

Figure 8A:
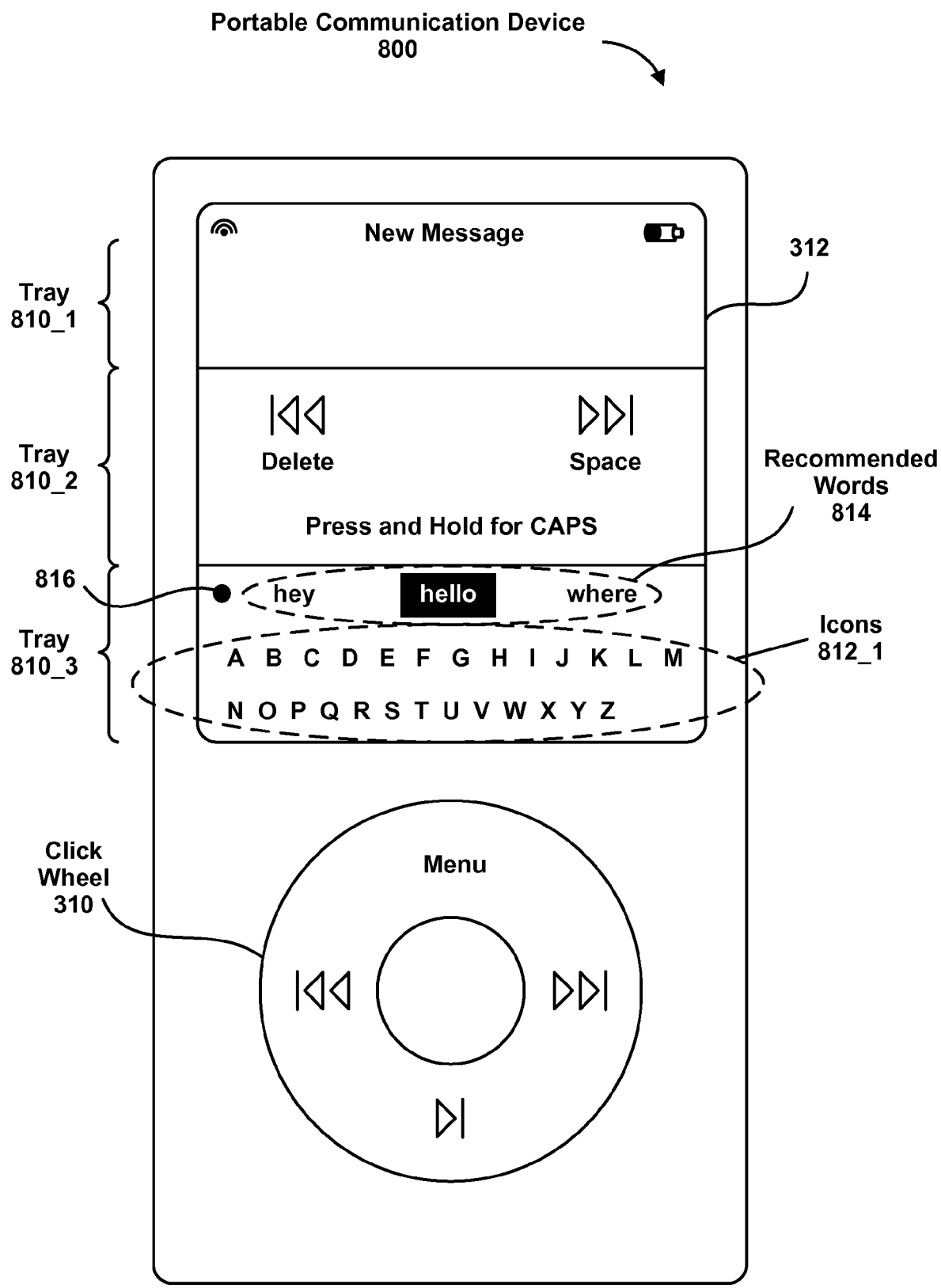
FIG. 8A is a schematic diagram illustrating an embodiment of a text entry user interface for a portable communication device.

In FIG. 8A, the device 800 has several trays 810 displayed on the display 312. A respective tray in the trays 810 includes a region of the display 312. A tray 810_1 may be configured to display one or more characters that are selected by the user. The user may select a respective character using the click wheel 310. The user may provide a user command that indicates such a selection in an analogous fashion to that discussed above with reference to FIGS. 3A-3D. A tray 810_2 may include one or more symbols that provide visual clues and/or explanations to the user as to current functions (in a current mode of operation) corresponding to one or more symbols on the click wheel 310. In this way, the user may be alerted to changes in the functionality of the click wheel 310 without changing the symbols on the click wheel 310. In other embodiments, one or more symbols displayed on the click wheel 310 may be modified in accordance with a current function(s) of the click wheel 310. In the embodiment shown in FIG. 8A, the tray 810_2 includes explanations for a delete function, a space function and instructions as to how to obtain a capitalized letter or character. These functions may be selected by pressing on an appropriate portion of the click wheel 310 and/or pressing on the click wheel 310 for at least a sixth pre-determined time interval. For example, the user may obtain a capitalized letter or character by highlighting a corresponding icon on the display 312 and pressing down on the click wheel 310 or a click wheel button 308 for longer than the sixth pre-determined time interval. The letter or character may be selected (i.e., the user command may be provided) when the user presses down on or breaks contact with the click wheel 310 or the button 308. The sixth pre-determined time interval may be 0.5, 1 or 2 s.

Figure 14A:
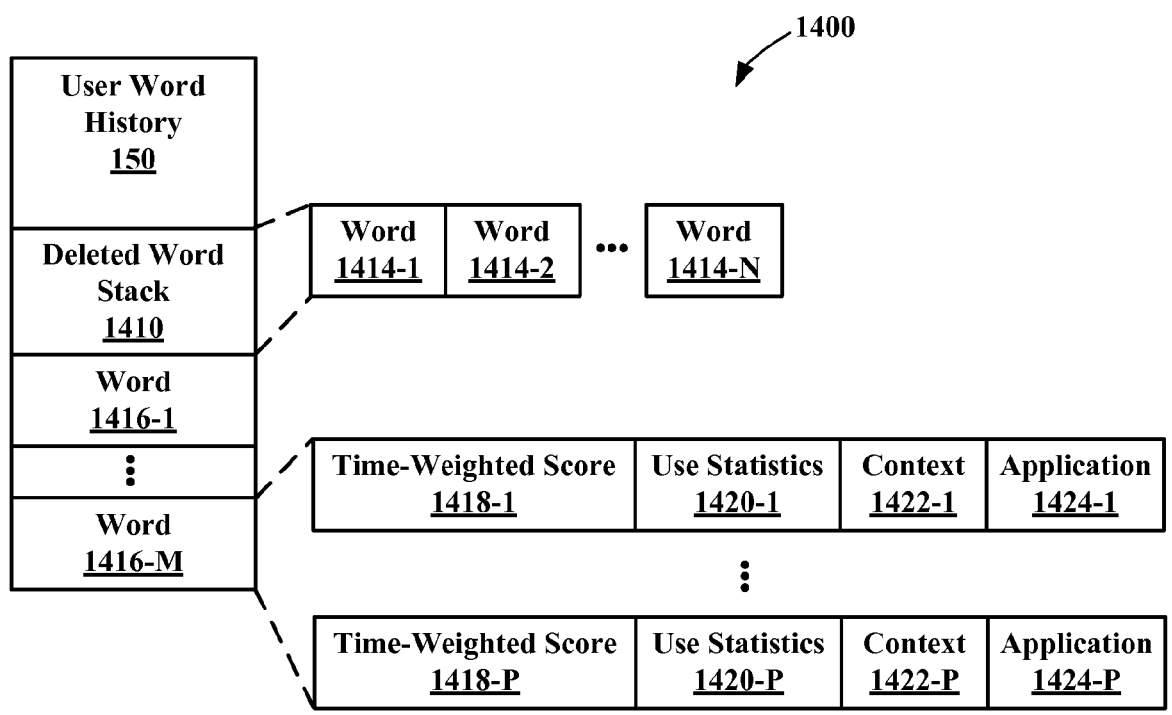
FIG. 14A is a block diagram illustrating an embodiment of a user word history data structure.
Figure 14B:
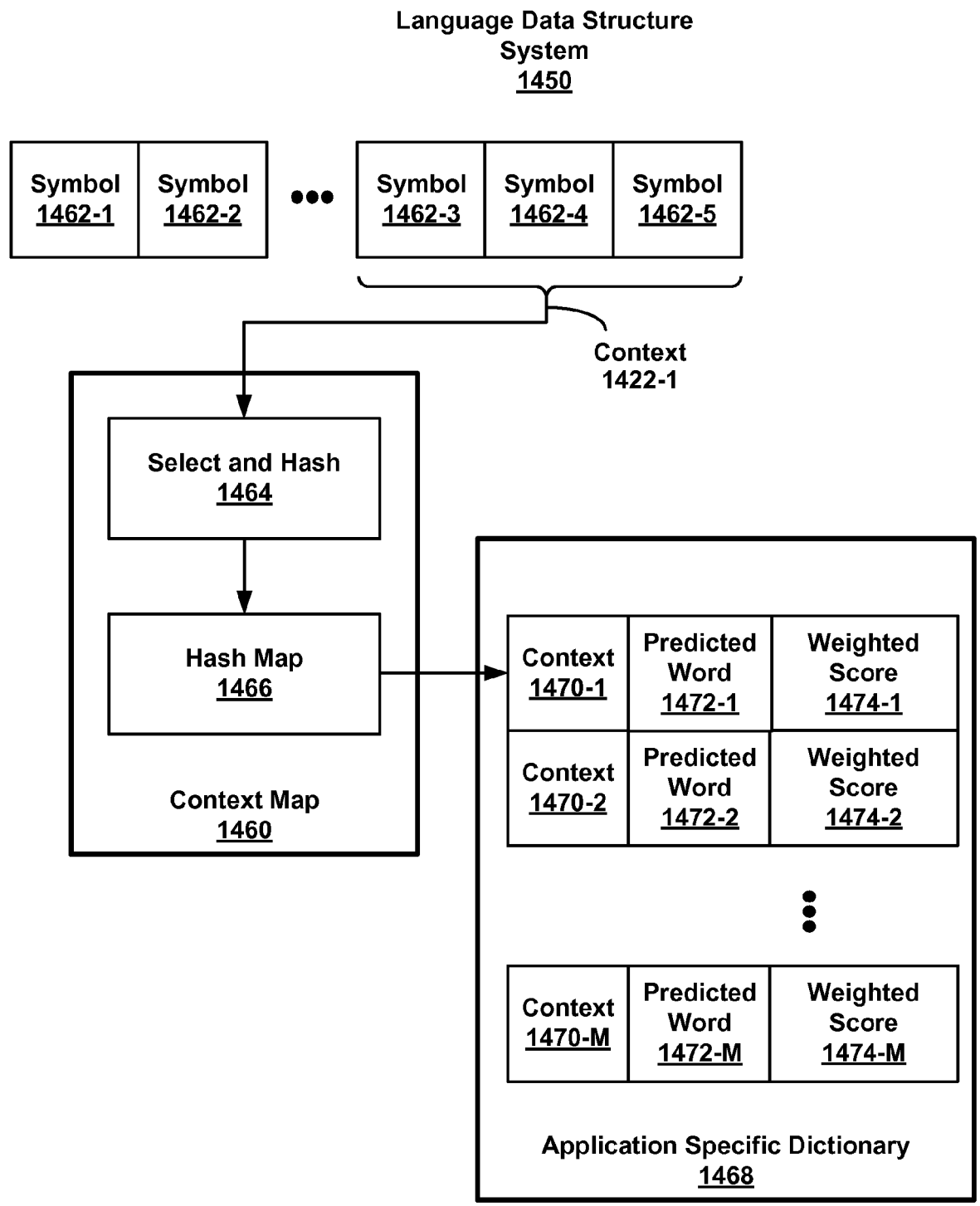
FIG. 14B is a block diagram illustrating an embodiment of a language data structure system.

A tray 810_3 may include a plurality of icons 812_1 corresponding to a set of characters (in this example, letters in the English alphabet) and one or more recommended words 814. The one or more recommended words 814 may be provided based on a language data structure system 1450 (FIG. 14B). In some embodiments, the one or more recommended words 814 are provided before receiving any characters selected by the user. For example, the one or more recommended words 814 may be in accordance with an application 136 and the user word history 150 (FIG. 1).

As illustrated in FIG. 8A, a current position in the tray 810_3 may be indicated by highlighting (e.g., shading) of a respective icon (a current position icon) in the tray 810_3, in this case, of the word 'hello'. The icons 812_1 and the one or more recommended words 814 may constitute a set. The user may scroll or move through this set by providing navigation commands using the click wheel 310 in an analogous fashion to that discussed above with reference to FIGS. 3A-3D. In some embodiments, the user may provide a plurality of user commands using the click wheel 310, including selection of multiple icons, while maintaining contact with the click wheel 310. Thus, the user may provide navigation commands (by moving a point of contact with at least a portion of the click wheel 310) and user commands (by pressing on the click wheel 310) while maintaining contact with the click wheel 310. This may increase a number of characters, symbols and/or words that the user may select per minute and may make it easier for the user to use the device 800.

Figure 8B:
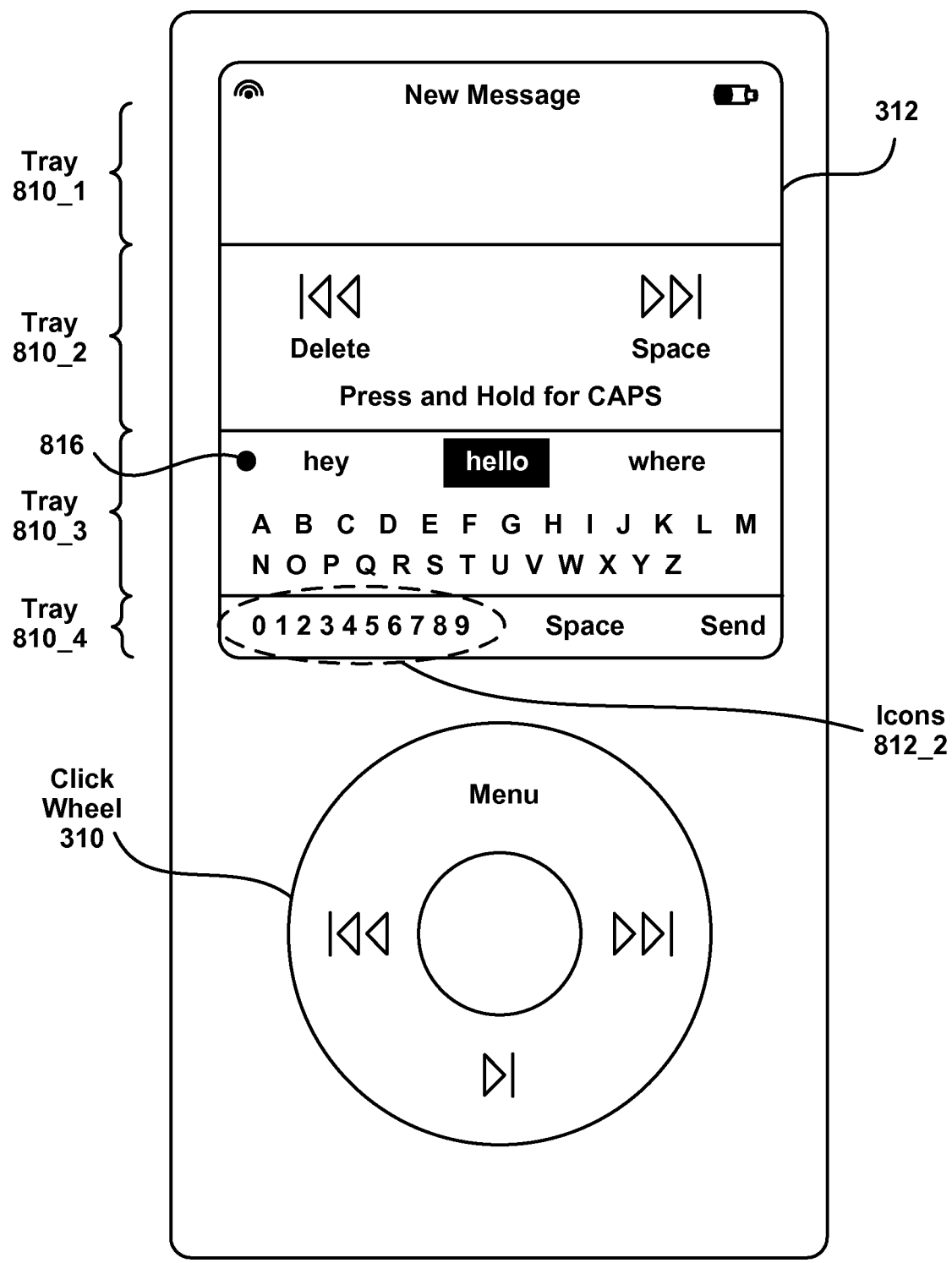
FIG. 8B is a schematic diagram illustrating an embodiment of a text entry user interface for a portable communication device.

In some embodiments, the device 800 includes one or more additional trays. This is illustrated in FIG. 8B, which includes a tray 810_4. The tray 810_4 may include a plurality of icons 812_2 corresponding to a set of characters (in this case, numbers). In some embodiments, the icons 812_1, the icons 812_2 and the one or more recommended words 814 may constitute a set. The user may scroll or move through this set by providing navigation commands using the click wheel 310 in an analogous fashion to that discussed above with reference to FIGS. 3A-3D.

The tray 810_4 may include icons corresponding to inserting a space in a message and to sending a message. The user may select one of these icons by providing commands using the click wheel 310. In some embodiments, a space may be automatically added after one or more of the recommended words 814 (FIG. 8A) are selected by the user.

Figure 8C:
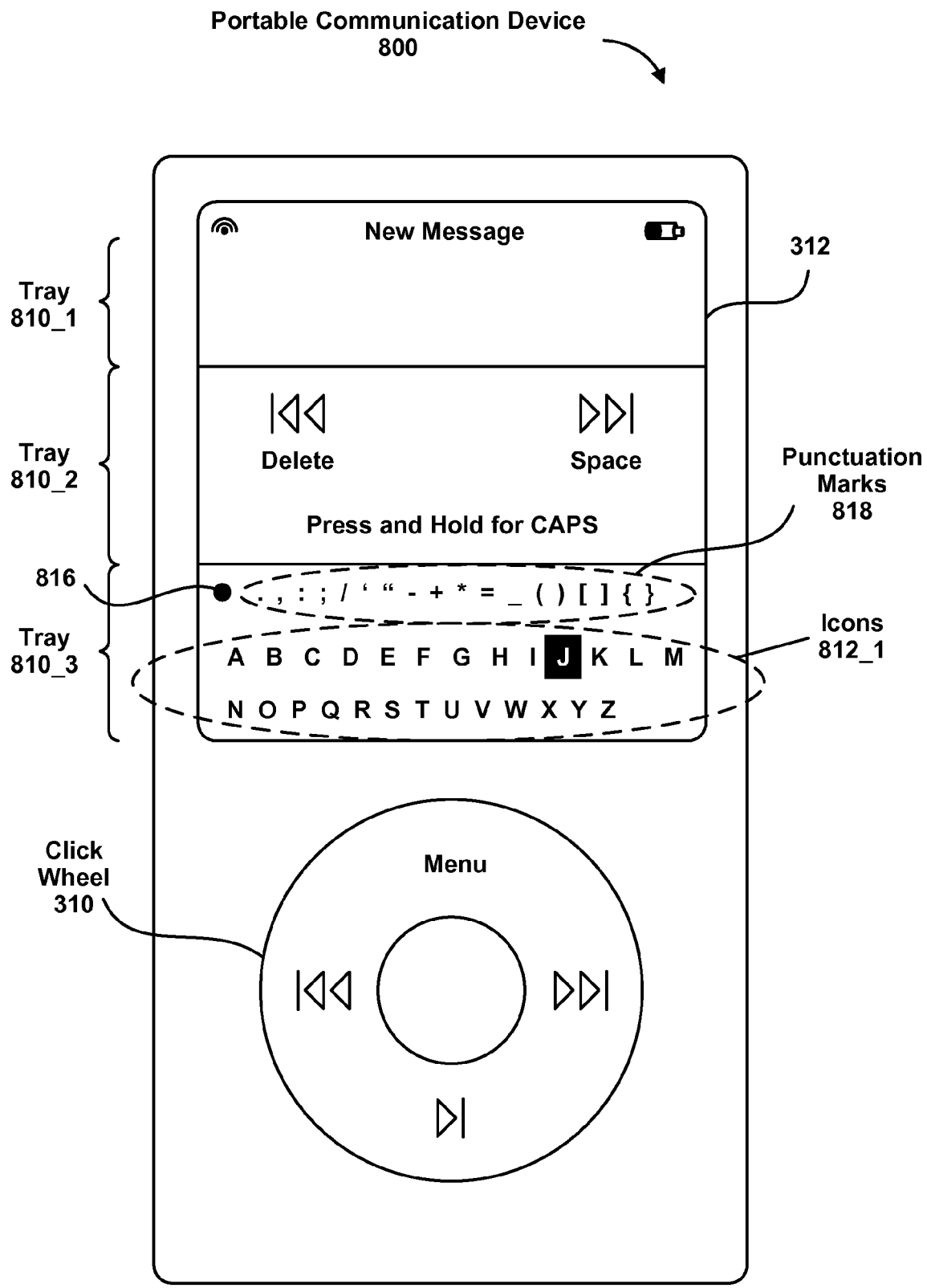
FIG. 8C is a schematic diagram illustrating an embodiment of a text entry user interface for a portable communication device.

In some embodiments, the tray 810_3 may include a display adjustment icon 816. If the user selects the display adjustment icon 816, additional icons may be displayed in the tray 810_3. This is illustrated in FIG. 8C. After selecting the display adjustment icon 816, the one or more recommended words 814 (FIG. 8A) are replaced by icons corresponding to punctuation marks 818. In some embodiments, selecting the display adjustment icon 816 a second time will replace the icons corresponding to punctuation marks 818 with the one or more recommended words 814 (FIG. 8A).

Figure 8D:
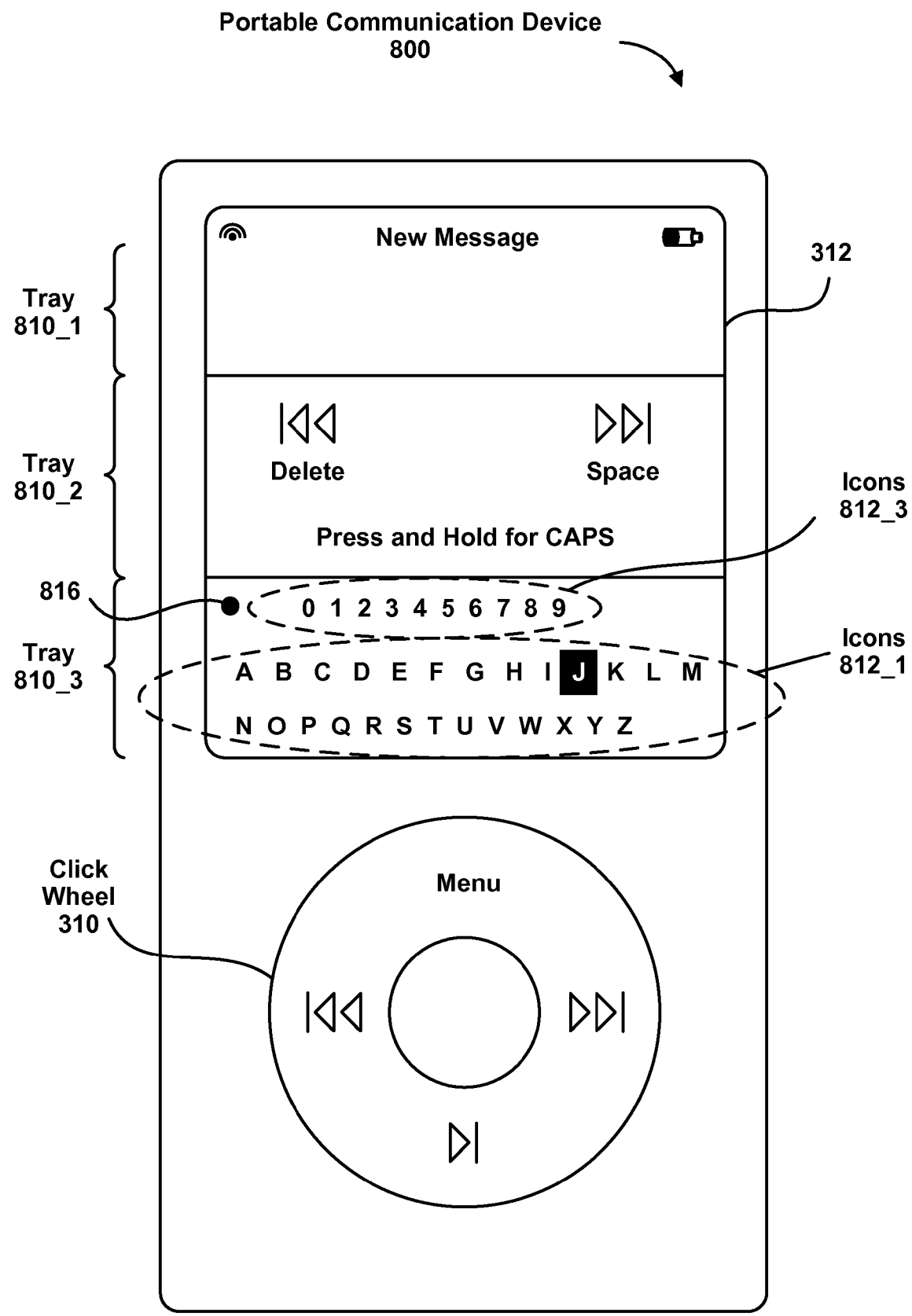
FIG. 8D is a schematic diagram illustrating an embodiment of a text entry user interface for a portable communication device.

In some embodiments, other icons corresponding to additional characters or sets of characters may be displayed if the display adjustment icon 816 is selected a second time and if the user presses down on the click wheel 310 or the click wheel button 308 for longer than a pre-determined time interval, such as the sixth pre-determined time interval. This is illustrated in FIG. 8D, which shows icons 812_3 (which in this case correspond to numbers).

In some embodiments, a space that was automatically added to a message after one or more of the recommended words 814 (FIG. 1) was selected may be automatically removed if a next user command corresponds to the display adjustment icon 816. For example, if selecting the display adjustment icon 816 corresponding to the displaying of the icons corresponding to the punctuation marks 818 (FIG. 8C), the automatically added space may not be needed in the message and may, therefore, be automatically removed.

Figure 8E:
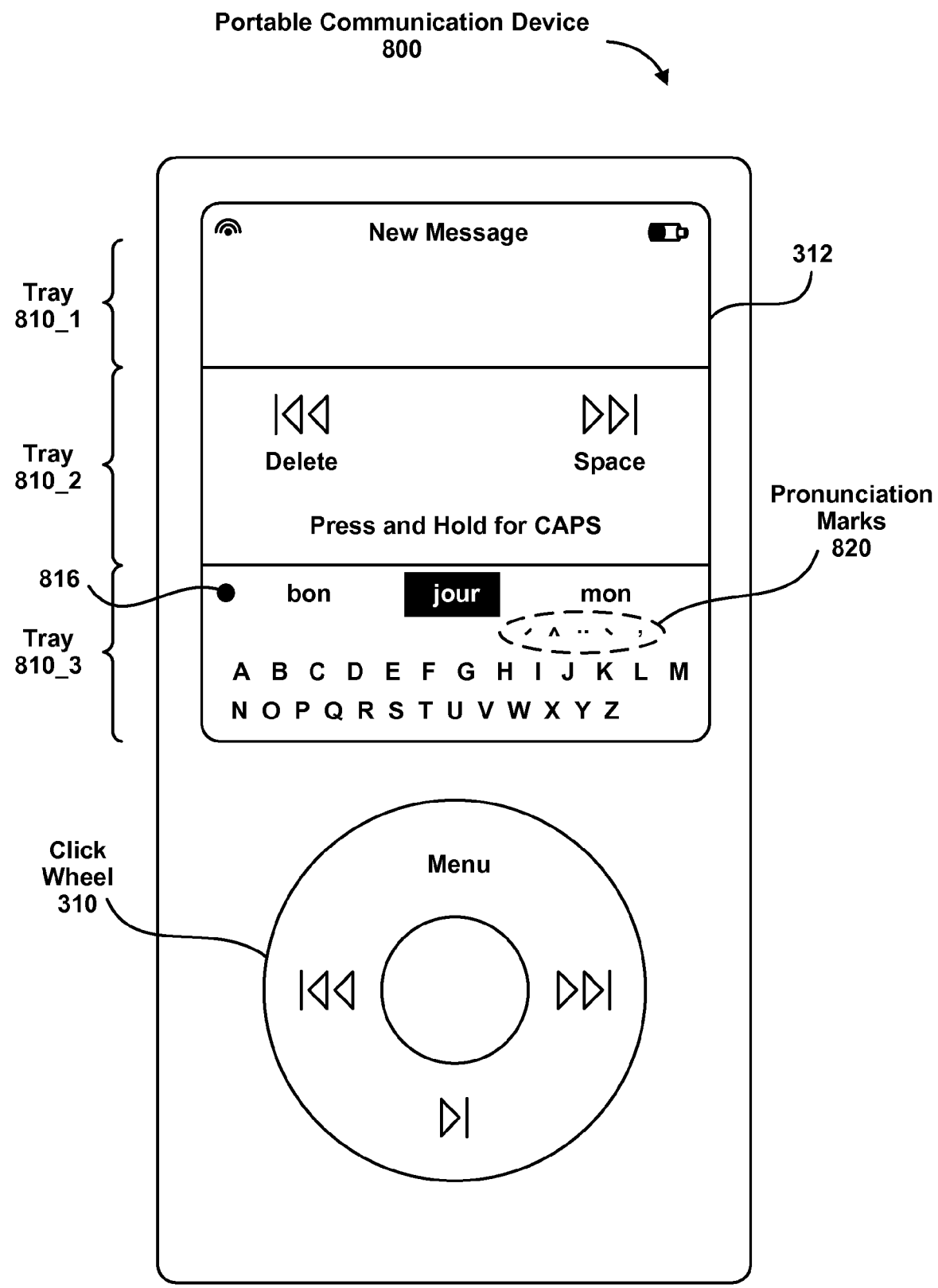
FIG. 8E is a schematic diagram illustrating an embodiment of a text entry user interface for a portable communication device.

Depending on the character sets that are being used by the user, in some embodiments the device 800 may display one or more icons corresponding to pronunciation marks 820 after a respective icon is selected. This is illustrated in FIG. 8E, which shows icons corresponding to pronunciation marks 820 displayed in the tray 810_3. Selecting one of these icons may modify the previously selected respective icon to include the corresponding pronunciation mark.

Figure 9A:
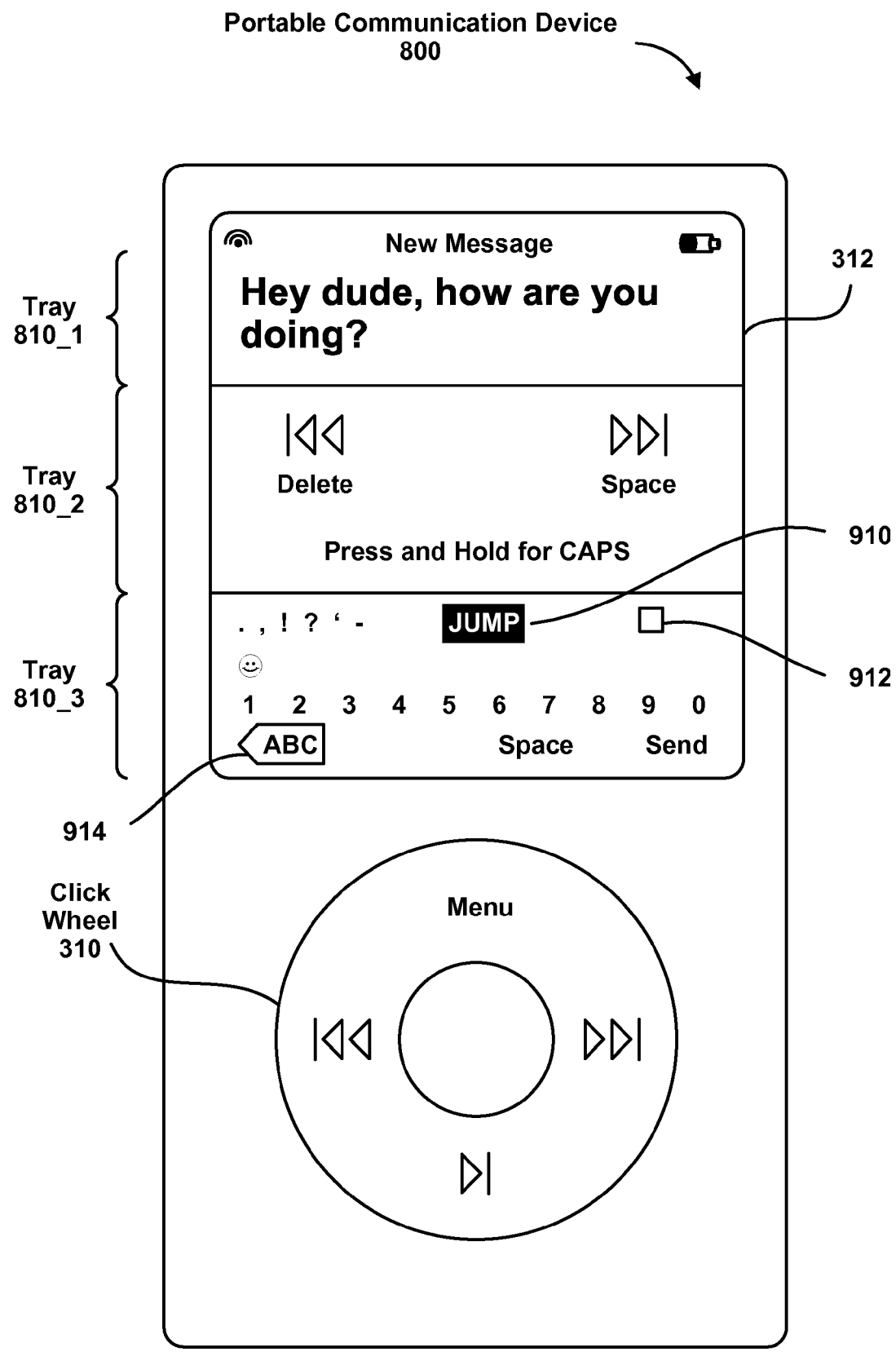
FIG. 9A is a schematic diagram illustrating an embodiment of a text entry user interface for a portable communication device.
Figure 9B:
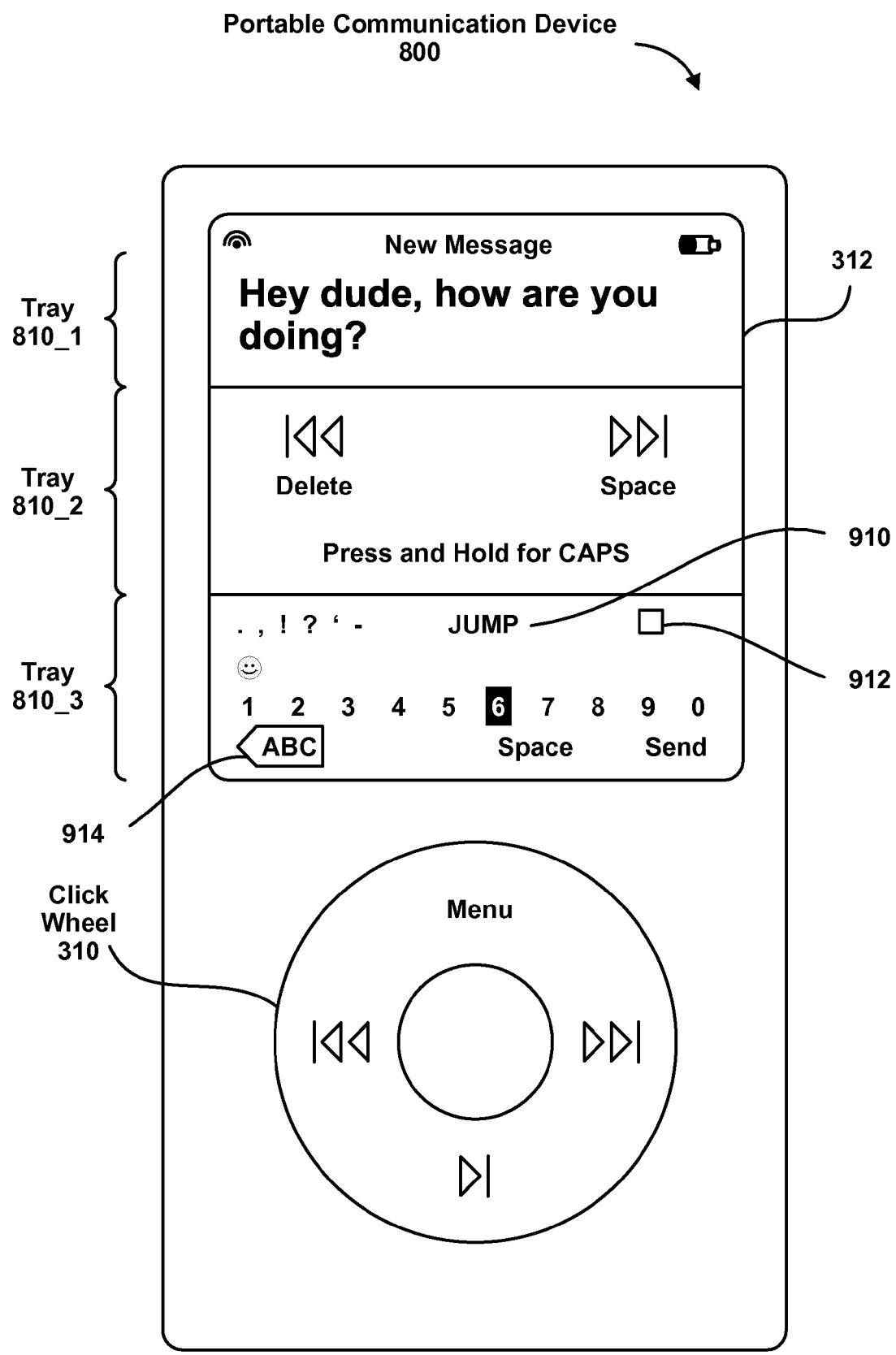
FIG. 9B is a schematic diagram illustrating an embodiment of a text entry user interface for a portable communication device.

FIGS. 9A and 9B illustrate additional embodiments of user interfaces for text messaging. In FIG. 9A, tray 810_1 displays a message that is being composed, including characters and/or words that have been previously selected by the user. Tray 810_3 includes a plurality of icons, including a 'JUMP' icon 910 and alternate character set icons 912 and 914. Selecting one or the alternate character set icons 912 and 914 may result in additional icons corresponding to additional character sets being displayed on the display 312. Selecting the 'JUMP' icon 910 may lead to a discontinuous change in the current position in the tray 810_3. This is illustrated in FIG. 9B, which shows the highlighting corresponding to the current position moving from the 'JUMP' icon 910 to the number 6.

Figure 10:
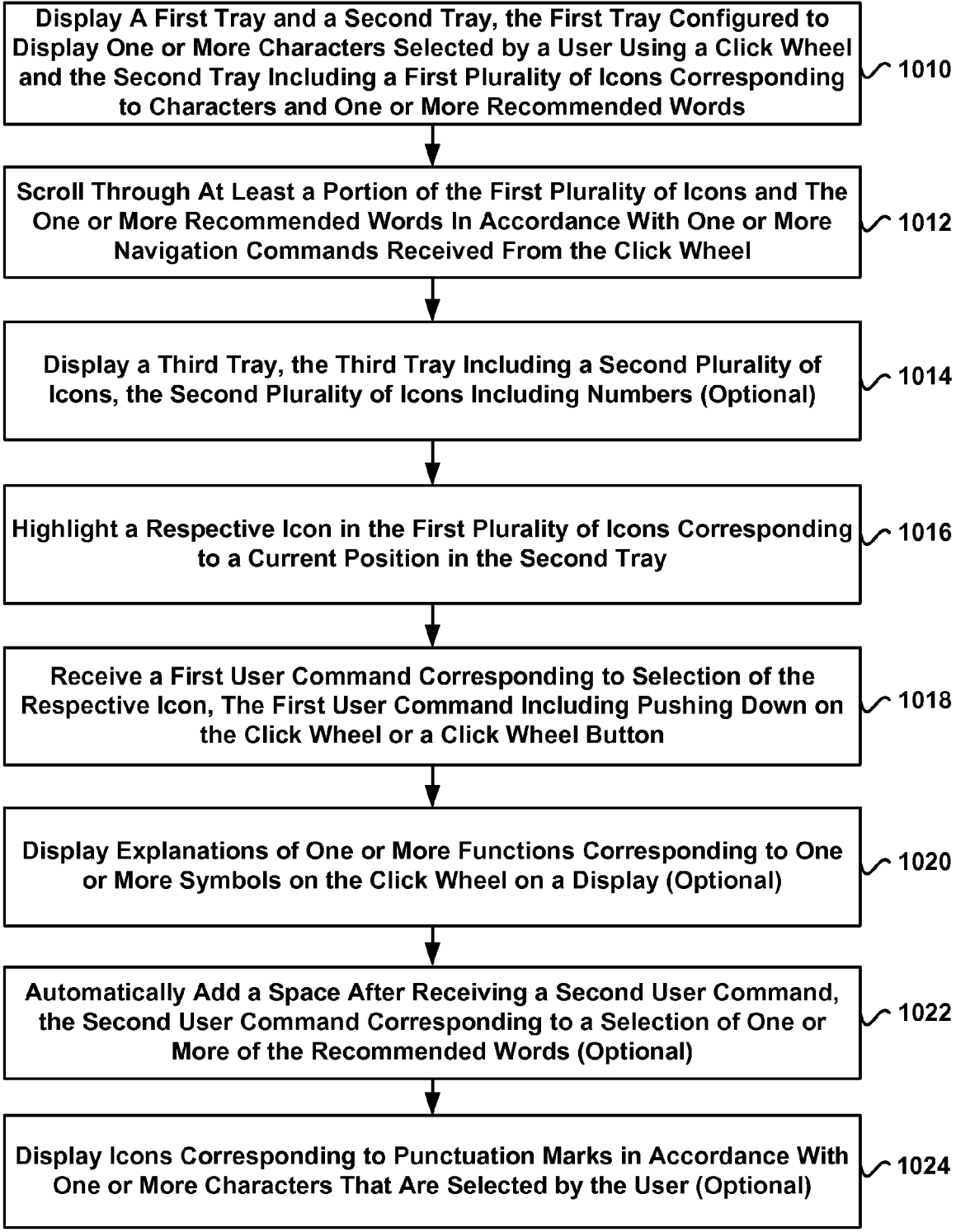
FIG. 10 is a flow diagram of an embodiment of a text entry process.

FIG. 10 is a flow diagram of an embodiment of a text entry process 1000. While the text entry process 1000 described below includes a number of operations that appear to occur in a specific order, it should be apparent that the process 1000 can include more or fewer operations, which can be executed serially or in parallel (e.g., using parallel processors or a multi-threading environment), an order of two or more operations may be changed and/or two or more operations may be combined into a single operation.

A first tray and a second tray are displayed (1010). The first tray is configured to display one or more characters selected by a user using a click wheel and the second tray may include a first plurality of icons corresponding to characters and one or more recommended words. At least a portion of the first plurality of icons and one or more recommended words are scrolled through in accordance with one or more navigation commands received from the click wheel (1012). A third tray is optionally displayed (1014). The third tray includes a second plurality of icons. The second plurality of icons includes numbers. A respective icon in the first plurality of icons corresponding to a current position in the second tray is highlighted (1016). A first user command corresponding to selection of the respective icon is received (1018). The first user command may include pushing down on the click wheel or a click wheel button. In some embodiments, after the first user command is received, the respective icon remains highlighted. In other embodiments, after the first user command is received, the first recommended word icon is highlighted, which makes it easier for the user to select the first recommended word. Explanation of one or more functions corresponding to one or more symbols on the click wheel may be optionally displayed on the display (1020). A space may be automatically added after receiving a second user command (1022). The second user command may correspond to a selection of one or more of the recommended words. Icons corresponding to punctuation marks may be optionally displayed in accordance with one or more characters that are selected by the user (1024).

Figure 11:
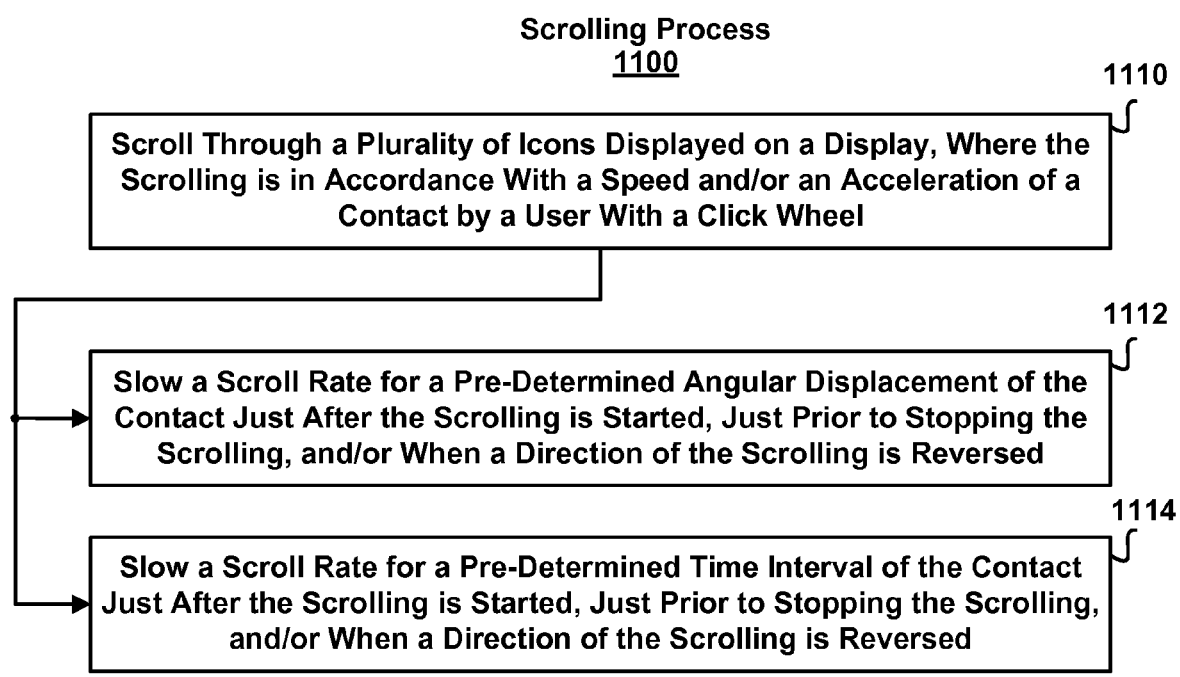
FIG. 11 is a flow diagram of an embodiment of a scrolling process.

A sensitivity of the scrolling through the trays 810 in FIGS. 8A-8E and 9A-9B as a function of the motion of the point of contact by the user may be adjusted and/or varied over time. Similar adjustment and/or variation in the scrolling sensitivity may be implemented in other applications 136 (FIG. 1), such as the telephone module 138. FIG. 11 is a flow diagram of an embodiment of a scrolling process 1100. While the scrolling process 1100 described below includes a number of operations that appear to occur in a specific order, it should be apparent that the process 1100 can include more or fewer operations, which can be executed serially or in parallel (e.g., using parallel processors or a multi-threading environment), an order of two or more operations may be changed and/or two or more operations may be combined into a single operation.

A plurality of icons displayed on a display are scrolled through (1110). The scrolling is in accordance with a speed and/or an acceleration of a point of contact by a user with a click wheel. In some embodiments, a scroll rate is slower for a pre-determined angular displacement of the contact just after the scrolling is started, just prior to stopping the scrolling and/or when a direction of the scrolling is reversed (1112). In some embodiments, a scroll rate is slower for a pre-determined time interval of the contact just after the scrolling is started, just prior to stopping the scrolling and/or when a direction of the scrolling is reversed (1114).

Attention is now directed towards additional embodiments of user interfaces and associated processes for implementing replay recommendations on the device 100 (FIG. 1). One challenge associated with using the click wheel 310 (FIG. 9B) is that it may be difficult for the user to navigate within an existing message to correct an error, such as a spelling or lexicography error. As a consequence, the user may have to delete multiple words in the message in order to fix the error. In the user interface and process described below, at least some of the words in an existing message that are deleted may be replayed, i.e., provided to the user as recommended words, in a reverse sequential order to that when the words were deleted. In this way, it may be easier for a user to reconstruct the remainder of the message after correcting the error.

The device 100 (FIG. 1) may determine that there is a potential replay condition, i.e., that it may be appropriate to provide one or more recommended words as part of a replay recommendation, based on the user deleting one or more previously entered words in a message. In some embodiments, the potential replay recommendation may be in accordance with zero or more additional words, characters or symbols that the user adds to the message after deleting one or more words.

The user may select one or more of the recommended words in such a replay recommendation using the click wheel 114 (FIG. 1) or by making a gesture (such as a swipe) on a touch-sensitive display in the display system 112 (FIG. 1). Once a word is accepted, it may be removed from the recommended words and a next word in the reverse sequence of previously deleted words may be provided/recommended.

Figure 12A:
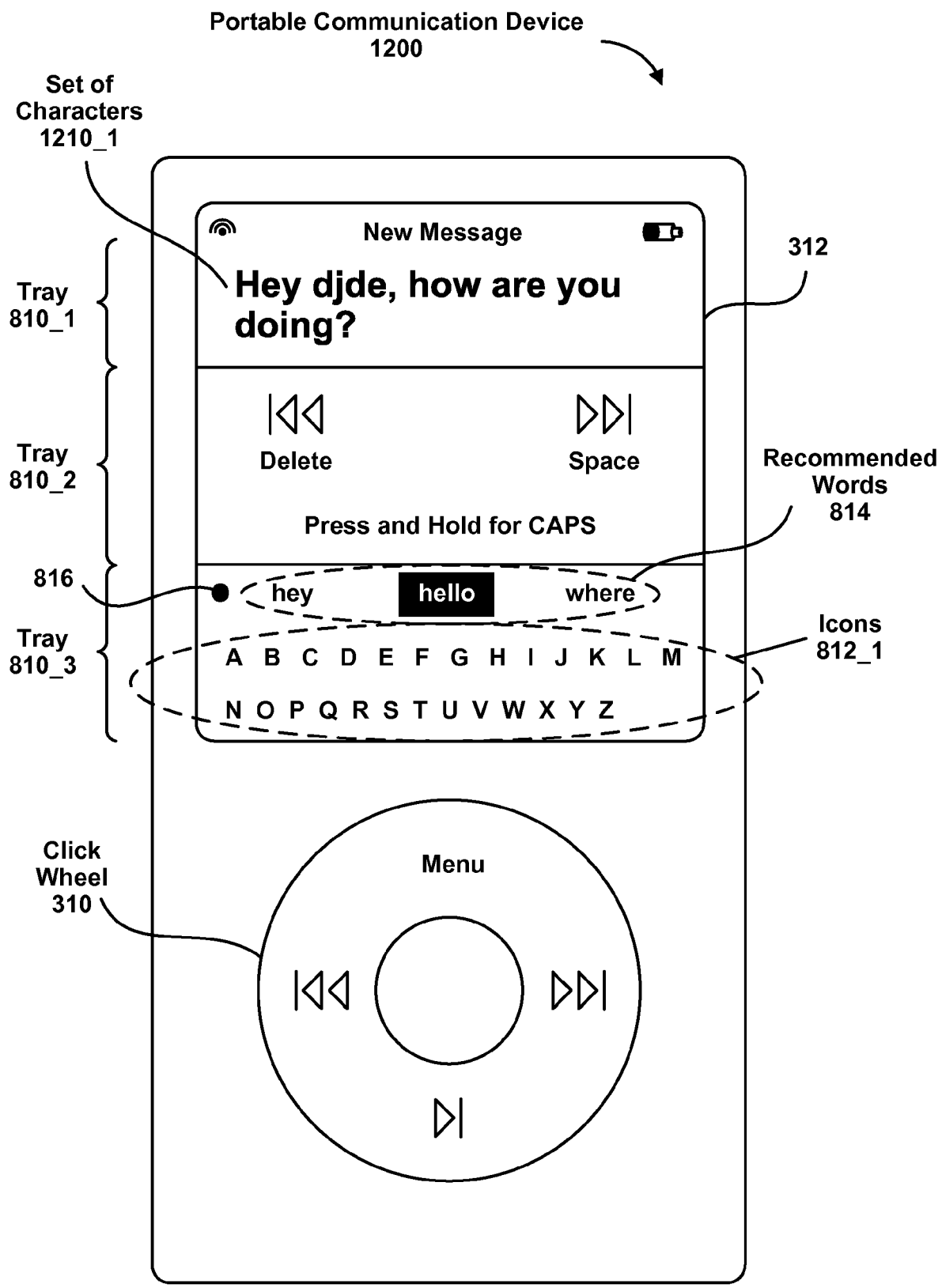
FIG. 12A is a schematic diagram illustrating an embodiment of replay recommendations in a user interface for a portable communication device.
Figure 12B:
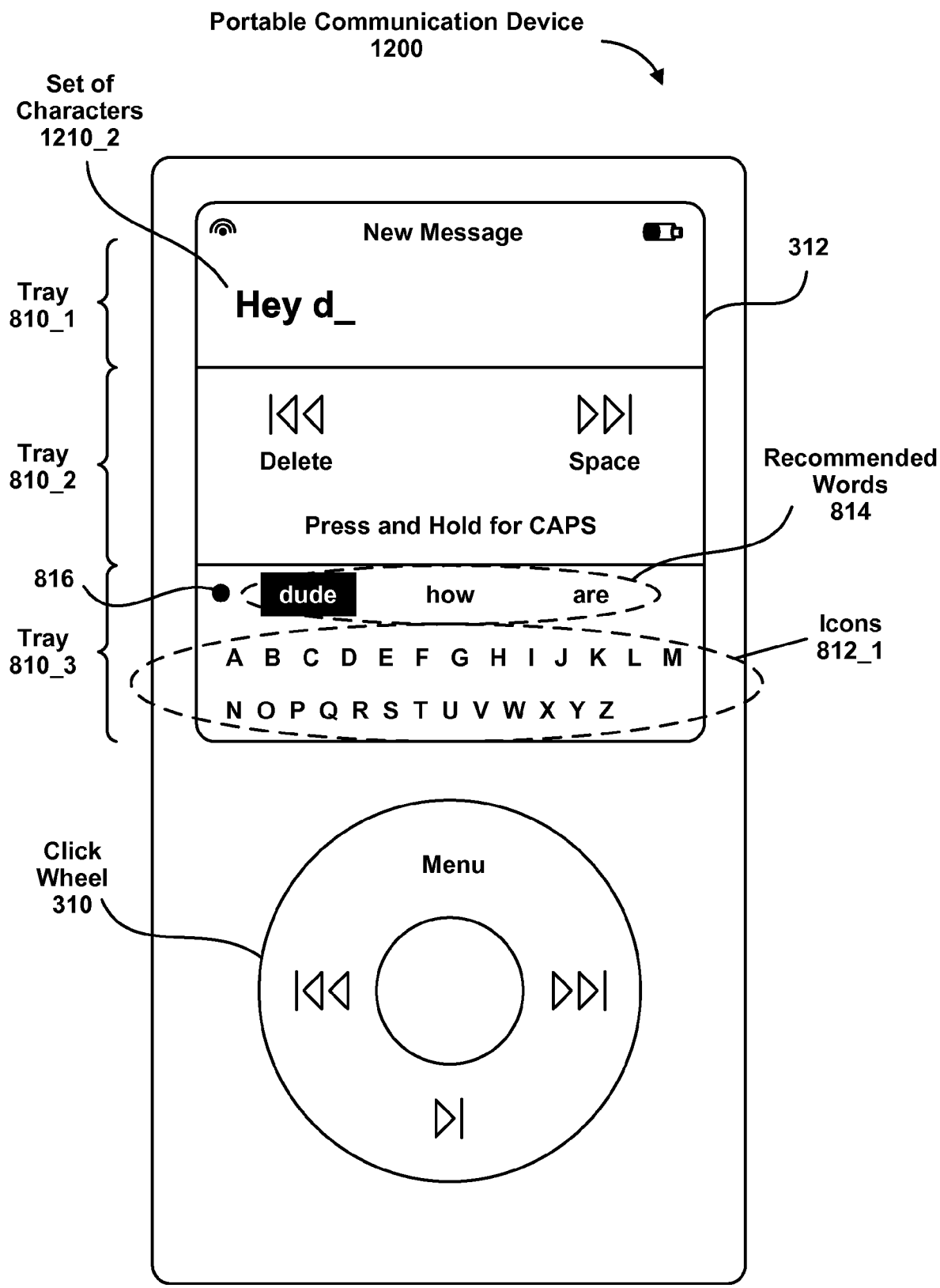
FIG. 12B is a schematic diagram illustrating an embodiment of replay recommendations in a user interface for a portable communication device.
Figure 12C:
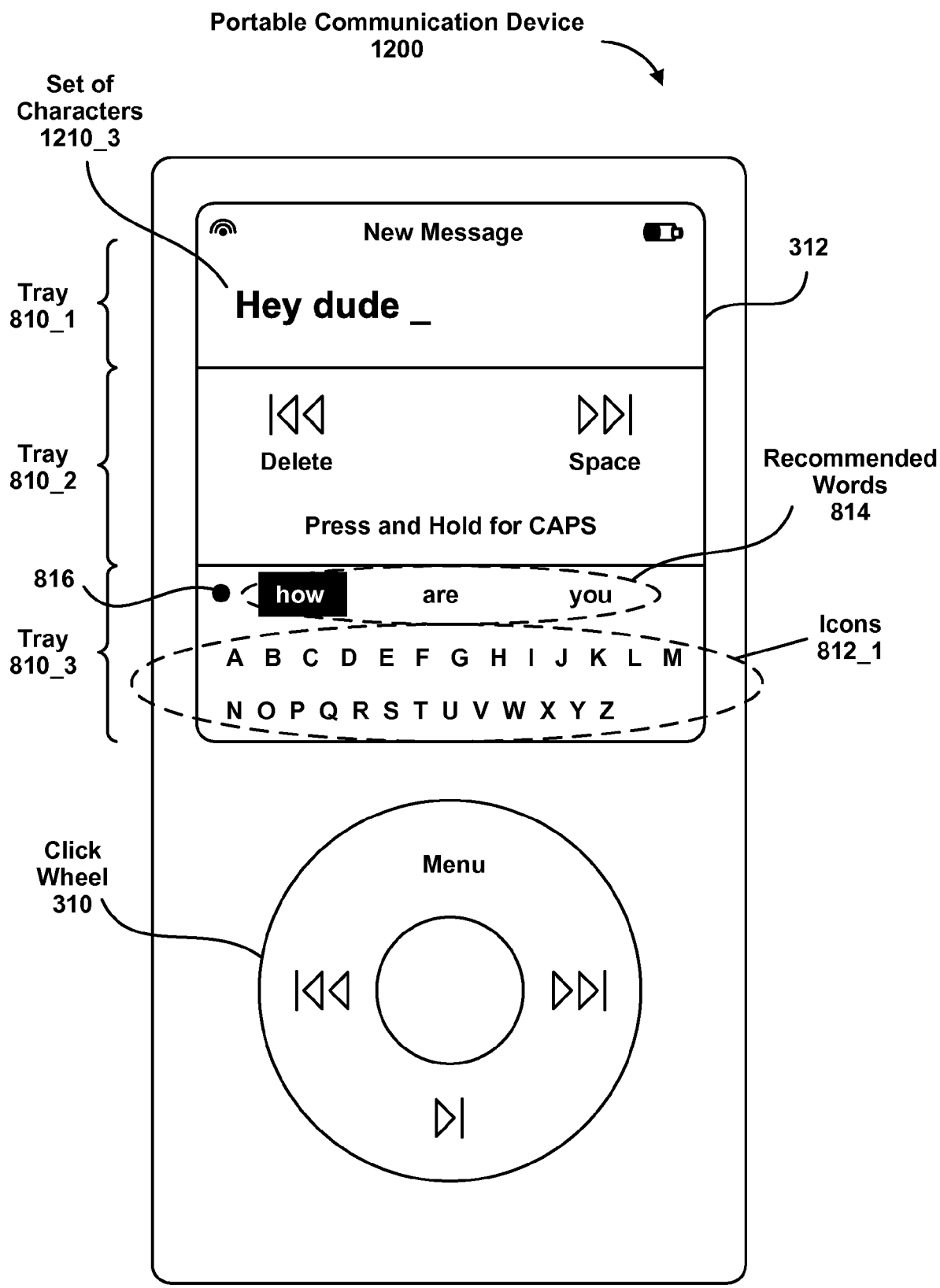
FIG. 12C is a schematic diagram illustrating an embodiment of replay recommendations in a user interface for a portable communication device.

FIGS. 12A-12C are schematic diagrams illustrating embodiments of user interfaces that may be implemented on a device 1200 during a replay recommendation process. While the device 1200 in these figures has been illustrated with certain components (including displayed information) and a particular arrangement of these components, it should be understood that there may be fewer or more components, two or more components may be combined, and positions of one or more components may be changed.

In FIG. 12A, a current set of characters 1210_1 that have been selected by the user (e.g., based on a sequence of user commands provided by the user) include a spelling error. The current set of characters 1210_1 includes a current sequence of words. In some embodiments, the current set of characters 1210_1 includes a grammatical error and/or a lexicography error. In some embodiments, the current set of characters 1210_1 includes a misspelled word (e.g., "djde", as shown in FIG. 12A) or an extra word (e.g., "Hey dude, how how are you doing?", not shown). In some embodiments, the current set of characters 1210_1 is missing a word (e.g., "Hey dude, are you doing?", not shown). The user commands may be provided using the click wheel 310. In other embodiments, the user commands may be provided using one hand or one finger, for example, using a touch-sensitive display.

In FIG. 12B, the user has deleted (i.e., provided user commands to delete) characters in the current set of characters, resulting in a new current set of characters 1210_2. Based on a determination of a potential replay condition, the device 1200 displays replay recommendations in the recommended words 814. These correspond to at least a subset of the previously deleted words from the current set of characters 1210_1. These previously deleted words are presented in reverse sequential order relative to an order in which at least the subset of the deleted words was deleted.

In FIG. 12C, the user has selected one or the recommended words 814. The word is added to a current set of characters 1210_3 and is removed from the recommended words 814. A next deleted word in the reverse sequential order of deleted words is displayed with the recommended words 814. This process may be repeated until the message is completed, i.e., the current set of characters 1210_1 (FIG. 12A) is restored without the spelling error (i.e., the spelling error in 1210_1 is corrected).

In some embodiments, the recommended words 814 may include additional words, characters and/or symbols that were not deleted. These words, characters and/or symbols may be determined using the language data structure system 1450 (FIG. 14B). In some embodiments, the additional recommendations may include punctuation marks and/or pronunciation marks.

In some embodiments, a space may be automatically inserted in the message after one or more of the recommended words 814 are accepted. In some embodiments, such a space is automatically removed if a next user command corresponds to selection of a punctuation mark. In some embodiments, one or more words in the current sequence of words 1210_3 may be capitalized in accordance with a context of the one or more words, characters and/or symbols in the current sequence of words 1210_3.

Figure 13:
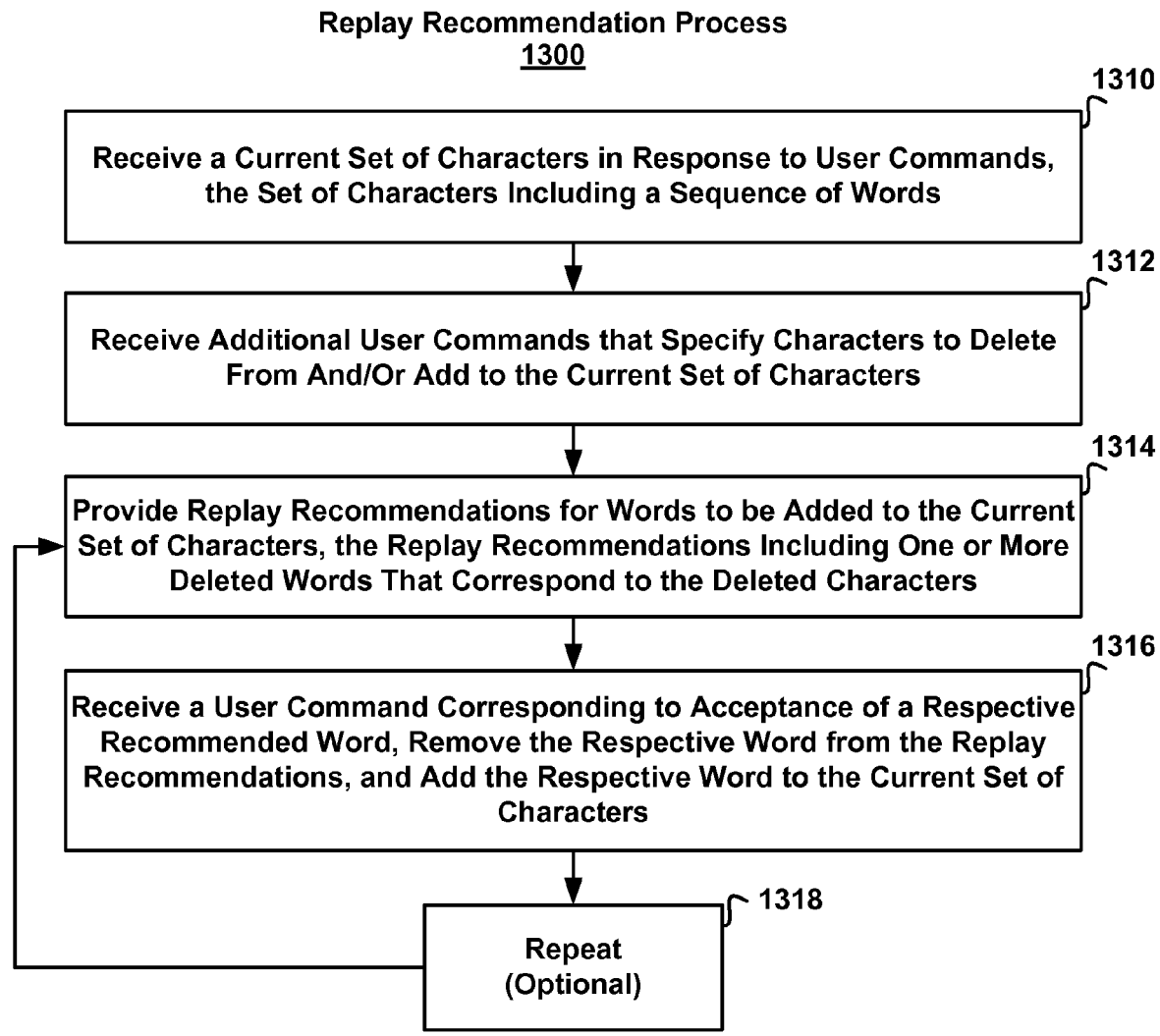
FIG. 13 is a flow diagram of an embodiment of a replay recommendation process.

FIG. 13 is a flow diagram of an embodiment of a replay recommendation process 1300. While the replay recommendation process 1300 described below includes a number of operations that appear to occur in a specific order, it should be apparent that the process 1300 can include more or fewer operations, which can be executed serially or in parallel (e.g., using parallel processors or a multi-threading environment), an order of two or more operations may be changed and/or two or more operations may be combined into a single operation.

A current set of characters is received in response to user commands (1310). The set of characters includes a sequence of words. Additional user commands that specify characters to delete from and/or add to the current set of characters are received (131 2). Replay recommendations for words to be added to the current set of characters are provided (1314). The replay recommendations include one or more deleted words that correspond to the deleted characters. A user command corresponding to acceptance of a respective recommended word is received, the respective recommended word is removed from the replay recommendations, and the respective word is added to the current set of characters (1316). Operations 1312 and 1314 may be optionally repeated 1318.

Attention is now directed towards embodiments of data structure systems that may be used in implementing the text messaging module 140 (FIG. 1), the text entry process (1000), the replay recommendation process 1300 (FIG. 13) and/or other applications 136 on the device 100 (FIG. 1). FIG. 14A is a block diagram illustrating an embodiment of a user word history data structure 1400. The user word history 150 may include a deleted word stack 1410 and multiple words 1416. The words 1416 may include one or more characters and/or one or more symbols. The deleted word stack 1410 includes one or more words 1414 in a sequential order in which the one or more words 1414 were deleted by the user in an application, such as the text messaging module 140 (FIG. 1). The deleted word stack 1410 may be used in the device 1200 (FIGS. 12A-12C) and in the replay recommendation process 1300 (FIG. 13).

A respective word in the words 1416, such as word 1416-M, may include multiple records. A respective record may include a time-weighted score 1418, use statistics 1420 (such as a time of use and/or a frequency of use), a context 1422 and one or more applications 1424. The time-weighted score 1418 may indicate a probability that the word 1416-M is a next predicted word based on the context 1422 (one or more characters, symbols and/or words that have previously been provided by the user) and/or the application 1424. For example, the time-weighted score 1418 for an email application may be different than the time-weighted score for the text messaging module 140 (FIG. 1). The time-weighted score 1418 may be computed to favorably weight (e.g., give a higher probability) to words that are used recently. For example, the time-weighted score 1418 may give favorable weighting to words 1416 that are used within the last 24 hours or week. Words 1416 used on longer time scales (e.g., more than a day or a week ago) may have their corresponding time-weighted scores 1418 reduced by a pre-determined ratio (such as 0.9) for each additional time interval (e.g., each day or week) since the words 1416 were last used.

The user history data structure 1400 may include static information (for example, corresponding to a dictionary and/or grammatical and syntax rules for one or more languages) as well as dynamic information (based on recent usage statistics and/or patterns). The user word history data structure 1400 may include a static dictionary built up by scanning a user's address book, emails, and other documents. The user history data structure 1400 may be dynamically updated continuously, after pre-determined time intervals, or when a new word or syntax is employed by the user. In some embodiments the user history data structure 1400 may include fewer or more components. Two or more components may be combined and an order of two or more components may be changed.

FIG. 14B is a block diagram illustrating an embodiment of a language data structure system 1450. The data structure system 1450 may be used to provide recommended words in the device 800 (FIGS. 8A-8E). A sequence of symbols 1462 (including one or more characters, symbols and/or words) may be provided by the user. A set of symbols 1462 corresponding to a context 1422-1 may be processed by a context map 1460. In some embodiments, the context 1422-1 may be a null set, e.g., one or more recommended words are provided before the user provides any symbols 1462 in a current application session. In other embodiments, the context 1422-1 may include one or more previously entered or provided words as well as one or more symbols, such as the first one, two or three letters in a current word that the user is providing. The context map 1460 may include a select and hashing module 1464 and a hash map 1466. The hash map 1466 may select one or more appropriate entries in an application-specific dictionary 1468. The entries in the application-specific dictionary 1468 may include contexts 1470, predicted words 1472, and time-weighted scores 1472. The application-specific dictionary 1468 may utilize the records in the user history data structure 1400. As a consequence, the application-specific dictionary 1468 may be dynamically updated continuously, after pre-determined time intervals, or when a new word or syntax is employed by the user.

The language data structure system 1450 may be used to provide one or more recommended words based on the context 1422-1. The context map 1460 may find a top-5 or top-10 best context 1470 matches. The corresponding predicted words 1472 may be recommended to the user in accordance with the time-weighted scores 1474. In some embodiments, only a subset of the predicted words 1470 corresponding to the best context 1470 matches may be presented to the user (e.g., just the top-1, top-2, or top-3 predicted words).

In some embodiments, the language data structure system 1450 may provide one or more recommended words in accordance with a state machine (corresponding to a Markov sequence or process) that corresponds to a language. For example, the application-specific dictionary 1468 may be based on a stochastic model of the relationships among letters, characters, symbols and/or words in a language.

A path memory (such as up to three characters in a word that is currently being entered and/or two or three previously entered words) of the probabilistic model represents a tradeoff between accuracy and the processing and power capabilities (for example, battery life) of the portable communication device 100 (FIG. 1). In some embodiments, such a probabilistic model may be based on a lexicography and usage that is user-specific and/or, as discussed previously, even application specific. For example, user emails, address book and/or other documents may be analyzed to determine an appropriate probabilistic model for that user based on the syntax and/or lexicography (including names and slang) that are employed by the user. The probabilistic model may be updated continuously, after pre-determined time intervals, or when a new word or syntax is employed by the user.

In some embodiments, the probabilistic model may be based on one or more mistakes made by the user when using the click wheel 114 (FIG. 1) and/or a touch-sensitive display in the display system 112 (FIG. 1). For example, if the user accidentally selects the wrong icon when typing a respective word, the probabilistic model may be updated to account for such errors in the future. In an exemplary embodiment, a mistake may be determined based on a user activation of an icon corresponding to the delete function. This adaptability of the portable communication device 100 (FIG. 1) may allow correction of user interface errors (such as parallax and/or left-right symmetry) associated with which finger(s) the user is using and how the user is holding the portable communication device 100 (FIG. 1) while using it. This adaptability of the portable communication device 100 (FIG. 1) may also be used to prevent the recommendation of misspelled words (e.g., by deleting such words from the user word history 150 or giving such words very low weighted scores).

In some embodiments the language data structure system 1450 may include fewer or more components. Two or more components may be combined and an order of two or more components may be changed.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
   at a portable electronic device:
   simultaneously displaying
   one or more characters selected by a user,
   a first plurality of icons that correspond to a set of characters, and
   one or more recommended words,
   wherein the first plurality of icons and the one or more recommended words comprise a set; and
   sequentially scrolling through the set comprising the first plurality of icons and the one or more recommended words in accordance with one or more received navigation commands, wherein the sequential scrolling wraps around from one end of the set to another end of the set.

2. The method of claim 1, wherein the first plurality of icons includes a display adjustment icon, and wherein the one or more recommended words are replaced by icons corresponding to punctuation marks when a first user command corresponding to selection of the display adjustment icon is received a first time and the icons corresponding to punctuation marks are replaced by the one or more recommended words when the first user command corresponding to selection of the display adjustment icon is received a second time.

3. The method of claim 2, further comprising automatically adding a space after a second user command corresponding to selection of at least one of the one or more recommended words is received and automatically removing the space if a next user command received corresponds to the display adjustment icon.

4. The method of claim 1, wherein the sequentially scrolling through the set is in accordance with one or more navigation commands received from a click wheel.

5. The method of claim 4, further comprising receiving a user command, wherein the user command corresponds to selection of a respective icon in the first plurality of icons, and wherein the user command includes pushing down on the click wheel.

6. The method of claim 4, further comprising receiving a user command, wherein the user command corresponds to selection of a respective icon in the first plurality of icons, and wherein the user command includes pushing down on a button at the center of the click wheel.

7. The method of claim 4, wherein the first plurality of icons includes one or more jump icons, and wherein clicking on a respective jump icon using the click wheel results in a discontinuous jump from one position in the set to another position.

8. The method of claim 4, wherein a scrolling rate is slower for a pre-determined angular displacement of the contact just after the scrolling is started, just prior to stopping the scrolling, and when a direction of the scrolling is reversed, than for other angular displacements.

9. The method of claim 4, wherein a scrolling rate is slower for a pre-determined time interval of the contact just after the scrolling is started, just prior to stopping the scrolling, and when a direction of the scrolling is reversed, than for other time intervals.

10. The method of claim 4, further comprising receiving a plurality of user commands using the click wheel, wherein the plurality of user commands correspond to selection of multiple icons in the first plurality of icons, and wherein the selection occurs while contact with the click wheel is maintained.

11. The method of claim 4, wherein the one or more navigation commands received from the click wheel are repetitions of a single navigation command.

12. A graphical user interface, on a portable electronic device with memory and one or more processors to execute one or more programs stored in the memory, the graphical user interface, comprising:
   one or more characters selected by a user,
   a first plurality of icons that correspond to a set of characters, and
   one or more recommended words,
   wherein:
      the first plurality of icons and the one or more recommended words comprise a set;
      the set comprising the first plurality of icons and the one or more recommended words is scrolled through sequentially in accordance with one or more received navigation commands; and
      the sequential scrolling wraps around from one end of the set to another end of the set.

13. The graphical user interface of claim 12, wherein sequentially scrolling through the set is in accordance with one or more navigation commands received from a click wheel.

14. The graphical user interface of claim 13, wherein the one or more navigation commands received from the click wheel are repetitions of a single navigation command.

15. A computer program product for use in conjunction with a portable electronic device, the computer program product comprising a computer readable storage medium and a computer program mechanism embedded therein, the computer program mechanism comprising instructions for:
   simultaneously displaying
      one or more characters selected by a user,
      a first plurality of icons that correspond to a set of characters, and
      one or more recommended words,
   wherein the first plurality of icons and the one or more recommended words comprise a set; and
   sequentially scrolling through the set comprising the first plurality of icons and the one or more recommended words in accordance with one or more received navigation commands, wherein the sequential scrolling wraps around from one end of the set to another end of the set.

16. The computer program product of claim 15, wherein the sequentially scrolling through the set is in accordance with one or more navigation commands received from a click wheel.

17. The computer program product of claim 16, wherein the one or more navigation commands received from the click wheel are repetitions of a single navigation command.

18. A portable electronic device, comprising:
   a display;
   one or more processors;
   memory; and
   one or more programs, wherein the one or more programs are stored in the memory and configured to be executed by the one or more processors, the one or more programs including:
   instructions for simultaneously displaying
      one or more characters selected by a user,
      a first plurality of icons that correspond to a set of characters, and
      one or more recommended words,
   wherein the first plurality of icons and the one or more recommended words comprise a set; and
   instructions for sequentially scrolling through the set comprising the first plurality of icons and the one or more recommended words in accordance with one or more received navigation commands, wherein the sequential scrolling wraps around from one end of the set to another end of the set.

19. The device of claim 18, wherein the sequentially scrolling through the set is in accordance with one or more navigation commands received from a click wheel.

20. The device of claim 19, wherein the one or more navigation commands received from the click wheel are repetitions of a single navigation command.

* * * * *

UNITED STATES PATENT AND TRADEMARK OFFICE
CERTIFICATE OF CORRECTION

PATENT NO. : 7,574,672 B2 Page 1 of 1
APPLICATION NO. : 11/459610
DATED : August 11, 2009
INVENTOR(S) : Jobs et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 361 days.

Signed and Sealed this

Seventh Day of September, 2010

David J. Kappos
*Director of the United States Patent and Trademark Office*